(12) United States Patent
Wu et al.

(10) Patent No.: US 11,564,054 B2
(45) Date of Patent: Jan. 24, 2023

(54) TRANSMISSION WITH INDICATION OF GEOGRAPHIC AREA

(71) Applicant: QUALCOMM Incorporated, San Diego, CA (US)

(72) Inventors: Zhibin Wu, Los Altos, CA (US); Sudhir Kumar Baghel, Hillsborough, NJ (US); Kapil Gulati, Hillsborough, NJ (US); Arjun Bharadwaj, Cupertino, CA (US); Hong Cheng, Bridgewater, NJ (US); Shailesh Patil, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/861,894

(22) Filed: Apr. 29, 2020

(65) Prior Publication Data
US 2020/0260214 A1    Aug. 13, 2020

Related U.S. Application Data

(63) Continuation of application No. 16/549,453, filed on Aug. 23, 2019.
(Continued)

(51) Int. Cl.
*H04W 4/02* (2018.01)
*H04W 4/12* (2009.01)
(Continued)

(52) U.S. Cl.
CPC ............ *H04W 4/02* (2013.01); *H04L 5/0055* (2013.01); *H04W 4/12* (2013.01); *H04W 4/40* (2018.02);
(Continued)

(58) Field of Classification Search
CPC ..... H04W 4/02; H04W 4/40; H04W 72/0406; H04W 4/12; H04W 28/0268; H04L 5/0055
See application file for complete search history.

(56) References Cited

U.S. PATENT DOCUMENTS

| 7,089,264 | B1 | 8/2006 | Guido et al. |
| 10,694,460 | B2 * | 6/2020 | Ingale .................. H04W 48/20 |

(Continued)

FOREIGN PATENT DOCUMENTS

| CN | 104661177 A | 5/2015 |
| EP | 3644644 A1 | 4/2020 |

(Continued)

OTHER PUBLICATIONS

Park Foreign priority application data; Sep. 21, 2018, KT Corporation (Year: 2018).*

(Continued)

*Primary Examiner* — Deepa Belur
(74) *Attorney, Agent, or Firm* — Procopio, Cory, Hargreaves & Savitch LLP/Qualcomm Incorporated

(57) ABSTRACT

An improved manner of transmitting and receiving messages in sidelink communication is presented in which a wireless device receives sidelink control information (SCI) that indicates a zone ID associated with a sidelink message. The wireless device determines a location of the wireless device and determines whether to send feedback for the sidelink message based, at least in part, on the zone ID associated with the sidelink message and the location of the wireless device. The feedback may include hybrid automatic repeat request (HARQ) feedback, and the sidelink message may include a groupcast message. The wireless device may further receive an indication of an intended range in the SCI and may determine whether to send the feedback based on (Continued)

a combination of the zone ID and the intended range for the sidelink message.

56 Claims, 13 Drawing Sheets

Related U.S. Application Data

(60) Provisional application No. 62/737,086, filed on Sep. 26, 2018.

(51) Int. Cl.
*H04W 28/02* (2009.01)
*H04W 72/04* (2009.01)
*H04L 5/00* (2006.01)
*H04W 4/40* (2018.01)

(52) U.S. Cl.
CPC ... *H04W 28/0268* (2013.01); *H04W 72/0406* (2013.01)

(56) References Cited

U.S. PATENT DOCUMENTS

| | | | |
|---|---|---|---|
| 2015/0011230 A1 | 1/2015 | Noh et al. | |
| 2015/0045061 A1 | 2/2015 | Da | |
| 2015/0327201 A1 | 11/2015 | He et al. | |
| 2016/0302137 A1 | 10/2016 | Escott et al. | |
| 2016/0337935 A1 | 11/2016 | Patil et al. | |
| 2017/0048922 A1* | 2/2017 | Lee | H04W 76/38 |
| 2017/0150314 A1 | 5/2017 | Hwang et al. | |
| 2017/0195163 A1 | 7/2017 | Chae et al. | |
| 2018/0115911 A1 | 4/2018 | Huang et al. | |
| 2018/0124574 A1 | 5/2018 | Byun et al. | |
| 2018/0139724 A1 | 5/2018 | Loehr et al. | |
| 2018/0152927 A1 | 5/2018 | Kim et al. | |
| 2018/0213382 A1 | 7/2018 | Tabet et al. | |
| 2019/0044667 A1 | 2/2019 | Guo et al. | |
| 2019/0053194 A1* | 2/2019 | Wei | H04B 17/318 |
| 2019/0053204 A1* | 2/2019 | Lien | H04L 1/0023 |
| 2019/0075447 A1 | 3/2019 | Lee et al. | |
| 2019/0090250 A1 | 3/2019 | Lee et al. | |
| 2019/0116475 A1 | 4/2019 | Lee et al. | |
| 2019/0158993 A1 | 5/2019 | Kwon | |
| 2019/0174479 A1 | 6/2019 | Yamazaki et al. | |
| 2019/0335532 A1* | 10/2019 | Kim | H04W 4/90 |
| 2019/0364402 A1* | 11/2019 | Lee | H04W 4/80 |
| 2019/0394786 A1* | 12/2019 | Parron | H04L 27/0006 |
| 2020/0029318 A1* | 1/2020 | Guo | H04W 88/023 |
| 2020/0040867 A1* | 2/2020 | Leege | F03C 1/0686 |
| 2020/0092685 A1* | 3/2020 | Fehrenbach | H04B 7/2606 |
| 2020/0099476 A1* | 3/2020 | Park | H04L 1/1812 |
| 2020/0100048 A1 | 3/2020 | Wu et al. | |
| 2020/0100167 A1* | 3/2020 | Cheng | H04W 4/40 |
| 2020/0100255 A1 | 3/2020 | Wu et al. | |
| 2020/0106566 A1* | 4/2020 | Yeo | H04W 28/04 |
| 2020/0162864 A1* | 5/2020 | Lee | H04L 5/0055 |
| 2020/0196279 A1 | 6/2020 | Thomas et al. | |
| 2020/0228951 A1* | 7/2020 | Chun | H04W 76/50 |
| 2020/0323023 A1* | 10/2020 | Miao | H04W 76/14 |
| 2020/0351033 A1* | 11/2020 | Ryu | H04L 1/1861 |
| 2021/0068071 A1* | 3/2021 | Wu | G01S 19/51 |
| 2021/0112445 A1* | 4/2021 | Wu | H04W 28/04 |
| 2021/0168648 A1 | 6/2021 | Lee et al. | |
| 2021/0203453 A1* | 7/2021 | Kim | H04L 1/1819 |
| 2021/0235246 A1* | 7/2021 | Hovey | H04W 80/02 |
| 2021/0242975 A1* | 8/2021 | Kim | H04L 27/2607 |
| 2021/0266212 A1 | 8/2021 | Chae et al. | |
| 2021/0314126 A1 | 10/2021 | Bae et al. | |
| 2021/0351877 A1* | 11/2021 | Xu | H04W 72/0446 |

FOREIGN PATENT DOCUMENTS

| | | | |
|---|---|---|---|
| WO | 2017103662 A1 | 6/2017 | |
| WO | 2017155320 A1 | 9/2017 | |
| WO | 2018084608 A2 | 5/2018 | |
| WO | 2020033089 A1 | 2/2020 | |
| WO | 2020064304 A1 | 4/2020 | |
| WO | WO-2021091089 A1 * | 5/2021 | |
| WO | WO-2021141408 A1 * | 7/2021 | |

OTHER PUBLICATIONS

International Search Report and Written Opinion—PCT/US2019/048171—ISA/EPO—dated Nov. 14, 2019.

Kondo T., et al., "A Design and Evaluation of a Geolocation-Aware Reliable Multi cast System on Wireless Networks", Applications and the Internet (SAINT) 2011 IEEE/IPSJ 11th International Symposium on, IEEE, Jul. 18, 2011, pp. 408-413, XP032047114, DOI: 10.1109/SAINT.2011.77, ISBN: 978-1-4577-0531-1, section III, figures 3-6.

Taiwan Search Report—TW108130447—TIPO—dated Oct. 5, 2022.

* cited by examiner

US 11,564,054 B2

TRANSMISSION WITH INDICATION OF GEOGRAPHIC AREA

CROSS-REFERENCE TO RELATED APPLICATION(S)

This application is a Continuation of U.S. patent application Ser. No. 16/549,453, entitled "TRANSMISSION WITH INDICATION OF GEOGRAPHIC AREA" and filed on Aug. 23, 2019, which claims the benefit of U.S. Provisional Application Ser. No. 62/737,086, entitled "Transmission with Indication of Geographic Area" and filed on Sep. 26, 2018, which are expressly incorporated by reference herein in their entirety.

INTRODUCTION

The present disclosure relates generally to communication systems, and more particularly, to a vehicle-to-vehicle (V2V), vehicle-to-everything (V2X), or other device-to-device (D2D) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a wireless device. The wireless device receives sidelink control information (SCI) that indicates a zone ID associated with a sidelink message. The wireless device determines a location of the wireless device. The wireless device determines whether to send feedback for the sidelink message based, at least in part, on the zone ID associated with the sidelink message and the location of the wireless device.

In another aspect of the disclosure, a method, a computer-readable medium, and an apparatus are provided for wireless communication at a wireless device. The wireless device determines a geographic location of the wireless device. The wireless device transmits SCI associated with a sidelink message, the SCI comprising a zone ID based, at least in part, on the geographic location of the wireless device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
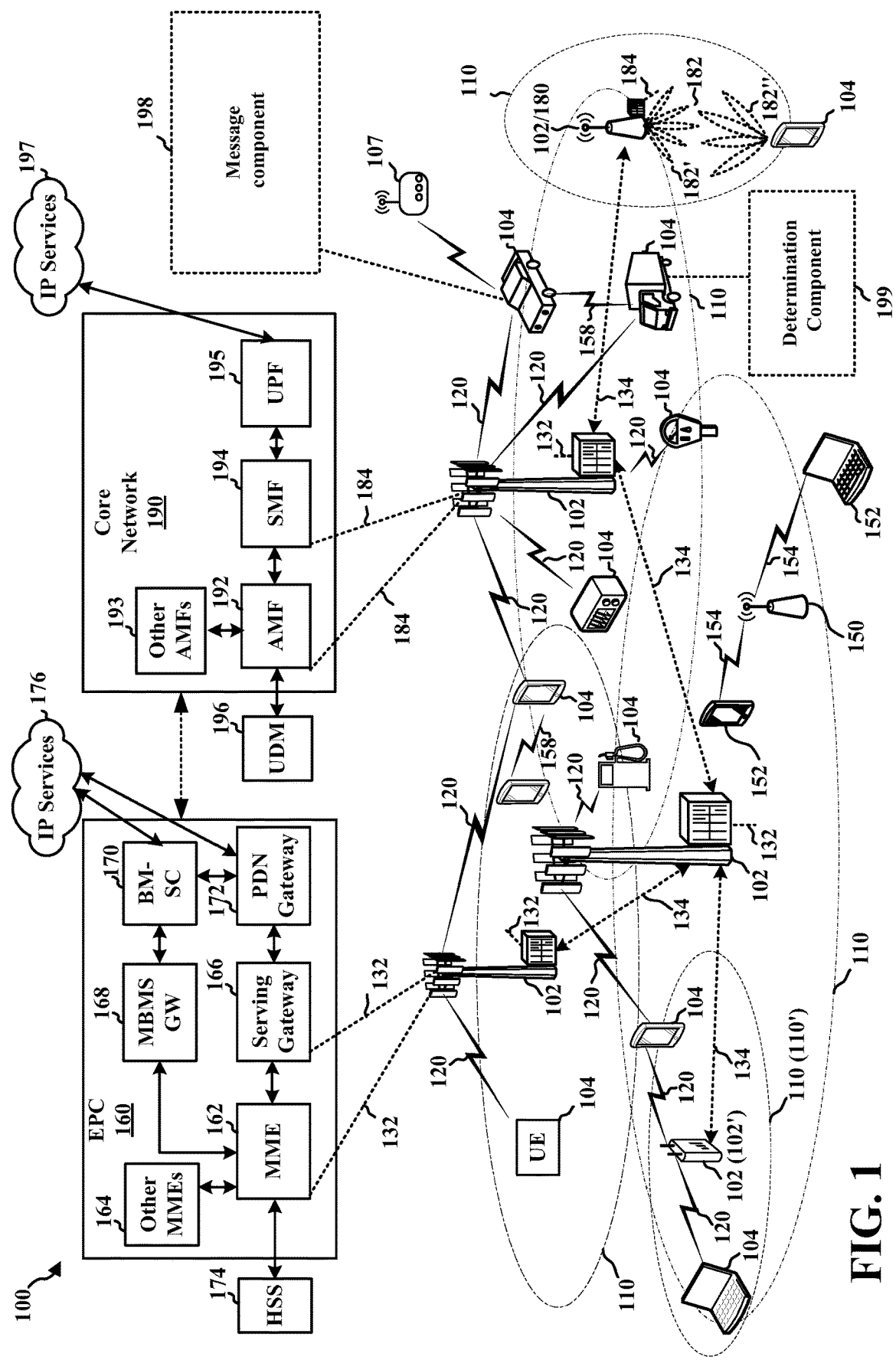
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Wireless communication may involve transmissions from a transmitting device for receipt by at least one receiving device. For example, a transmitting device may transmit a message via V2V/V2X/D2D to a receiving vehicle. As an example, the message may be multicast from the transmitting device and should be reliably received by certain receiving devices, e.g., devices for a corresponding service group, within a certain area including the transmitting device. In order to ensure that the message is reliably delivered to the receiving device(s), the transmitting device may listen for feedback from receiving devices(s) to determine whether the message was received correctly. Receiving device(s) may provide feedback. For example, receiving device(s) that do not successfully receive the message may respond to the transmitting device, e.g., with a Negative Acknowledgement (NACK). The NACK may prompt the transmitting device to retransmit the message. However, a receiving device that is distant from the transmitting device may respond with a NACK causing the transmitting device to retransmit the message in futile. Such feedback and wasted retransmissions for receiving devices that are at an undesirable proximity to the transmitting device degrade system performance. This problem may be especially challenging in a V2X/V2V/D2D environment due to the highly mobile nature of transmitters and/or receivers.

Aspects presented herein provide solutions in which feedback can be limited from receivers outside of an intended geographical area by providing information from the transmitting device to the receiving device that enables the receiving device to determine whether it is an intended receiver of the message. The receiving device can then determine whether to send feedback based on whether or not the receiving device is an intended receiver of the message in order to limit feedback from a receiving device that is not within the intended area.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, a UE 104 may be configured to transmit messages directly to another UE 104, e.g., UE. The communication may be based on V2V/V2X or other D2D communication, such as Proximity Services (ProSe). Aspects presented herein improve reliability of communication between the devices, e.g., engaged in PC5 based communication, while avoiding inefficient use of resources to retransmit to distant receivers. For example, the transmitting device, whether a UE, RSU, or base station, may determine its geographic location and may comprise a message component 198 that is configured to generate a message for a service group having a first indication of a geographic area associated with the message, the geographic area based at least in part on the geographic location of the mobile transmitting device. The message may also comprise group ID information. The transmitting device may then transmit the message, e.g. via V2X/V2V/D2D, to the service group. A receiving device, whether a UE, RSU, or base station, may receive the message. The message may comprise an indication of a geographic area associated with the message. The receiving device, e.g., UE 104, may determine a geographic location of the UE 104. The UE 104 may include a determination component 199 configured to determine whether to send a feedback for the message based on the first indication of the geographic area associated with the multicast message and the geographic location of the receiving device.

Figure 2:
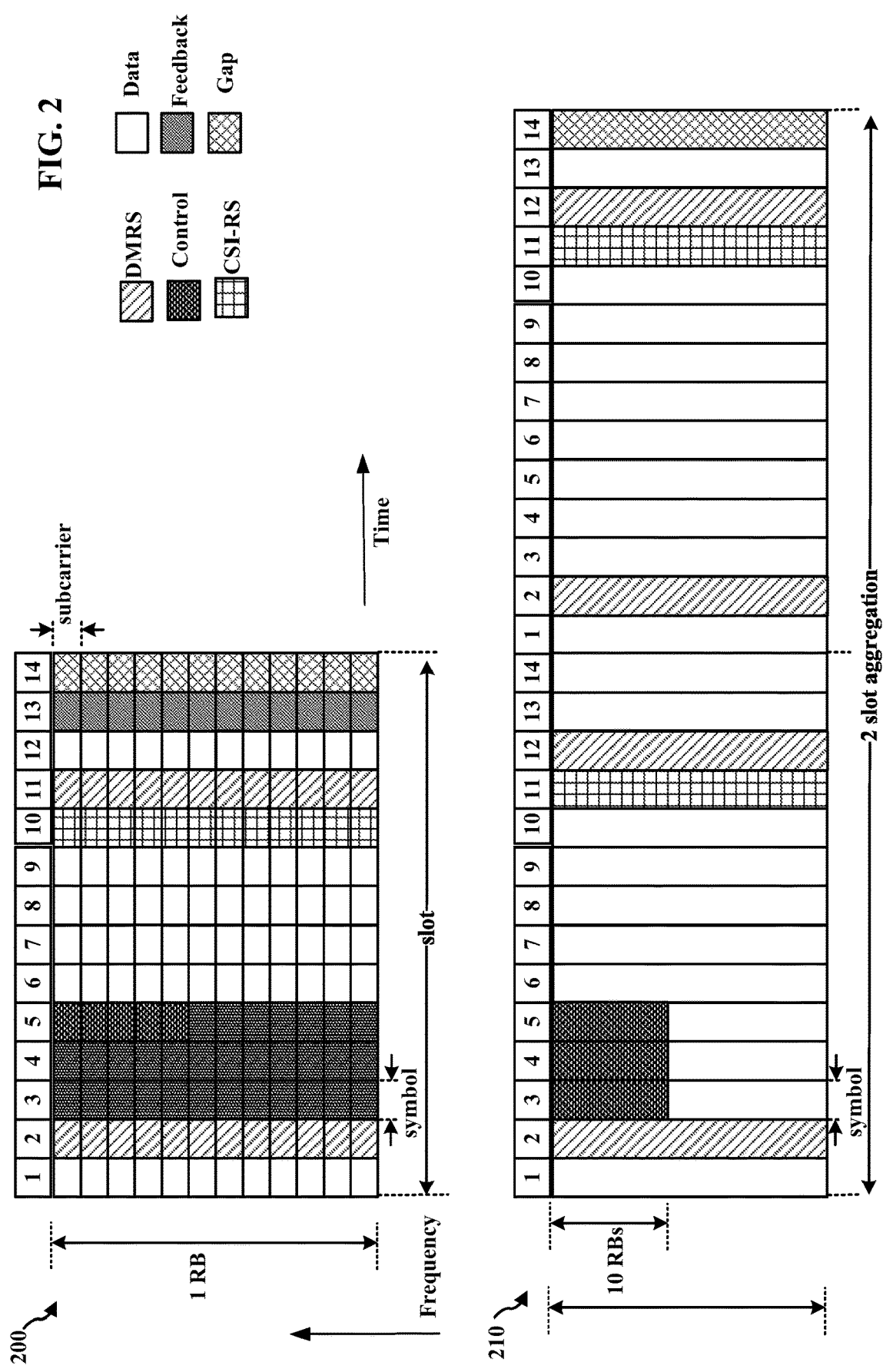
FIG. 2 illustrates example aspects of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in bursts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback.

Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slots. The aggregated number of slots may also be larger than two. When slots are aggregated, the symbols used for feedback and/or a gap symbol may be different than for a single slot. While feedback is not illustrated for the aggregated example, symbol(s) in a multiple slot aggregation may also be allocated for feedback, as illustrated in the one slot example.

Figure 3:
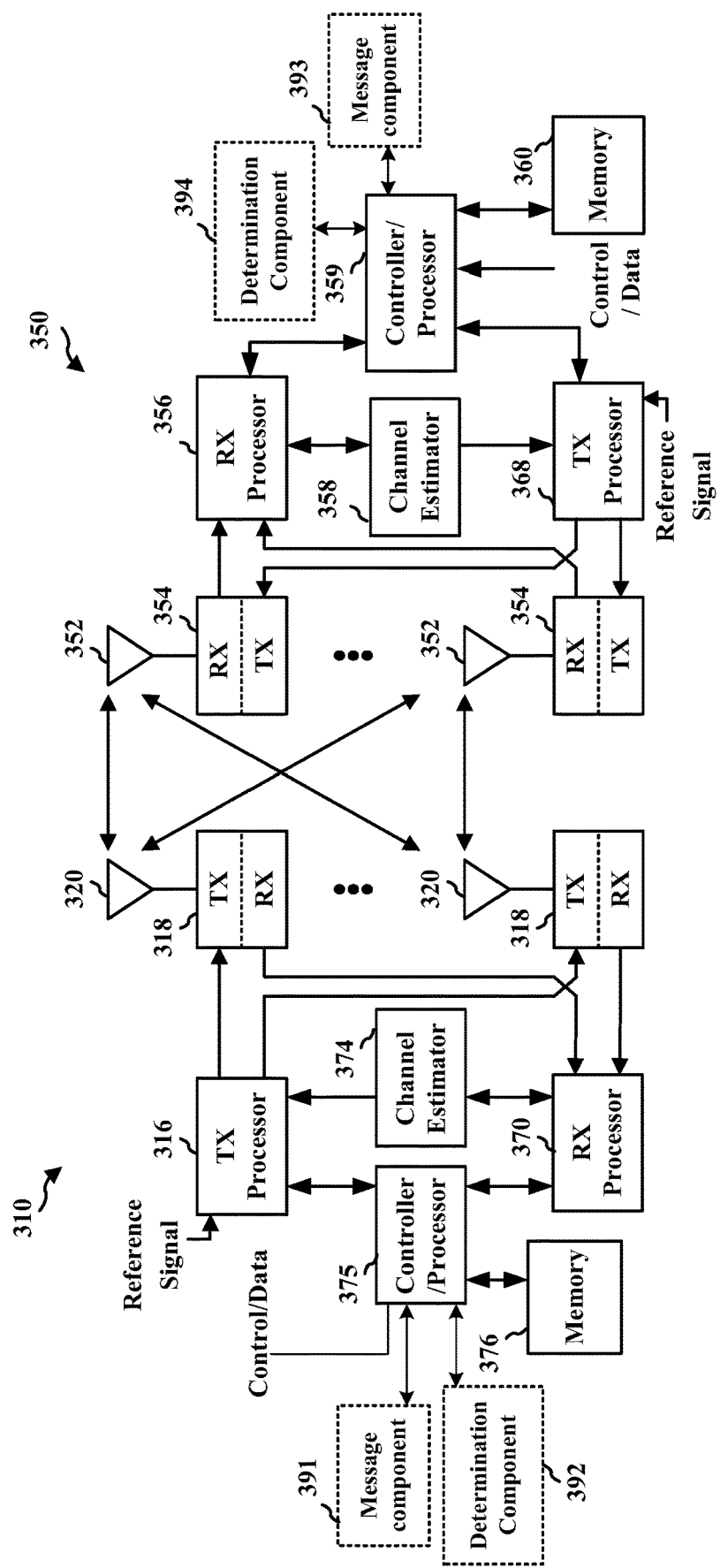
FIG. 3 is a diagram illustrating an example of a first device and a second device involved in wireless communication based, e.g., on V2V, V2X, and/or device-to-device communication.

FIG. 3 is a diagram of a first wireless communication device 310 in communication with a second wireless communication device 350 via V2V/V2X/D2D communication, e.g., via sidelink. The device 350 may comprise a UE communicating with other another device 350 via V2V/V2X/D2D communication, e.g., via sidelink. The first wireless communication device 310 may comprise a UE communicating with another UE, e.g., device 350, via sidelink. In addition to the other components illustrated in FIG. 3, devices 310 and 350 may each comprise a message component 391, 393 and/or a determination component 392, 394. The message component 391, 393 may be configured to generate a message having a first indication of a geographic area associated with the message, the geographic area based at least in part on the geographic location of the device 310, 350 that transmits the message. The determination component 392, 394 may be configured to determine whether to send a feedback for the message based on the first indication of the geographic area associated with the multicast message and the geographic location of the receiving device. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

Wireless communication may include multicast communication directly between UEs. As an example, multicast sidelink communication may be performed via a PC5 interface. UEs may communicate using sidelink multicast based on V2X communication, V2V communication, or D2D communication, for example. A multicast may involve a transmission from one UE that is intended to be decoded by UEs that are part of a service group. A service group may comprise one or more UEs. A group ID identifying the service group may be comprised in the message, e.g., in Sidelink Control Information (SCI) of the multicast message, and/or as part of the MAC layer destination address.

In a PC5 multicast, a transmitting UE may ensure that all intended receivers in the service group and in proximity of the transmitting UE accurately receive the message. If the intended receivers in the service group that are in the proximity of the transmitting UE do not receive the message accurately, the transmitting UE may retransmit the message in order to ensure accurate receipt of the message.

In order to improve reliability, feedback may be sent back from the receiving UEs in the service group. For example, if a particular UE in the service group does not correctly receive the message, the UE may transmit a NACK, e.g., via sidelink, indicating to the transmitting UE that there was an error in receiving the message. In response to the NACK, the transmitting UE may retransmit the message.

Figure 4:
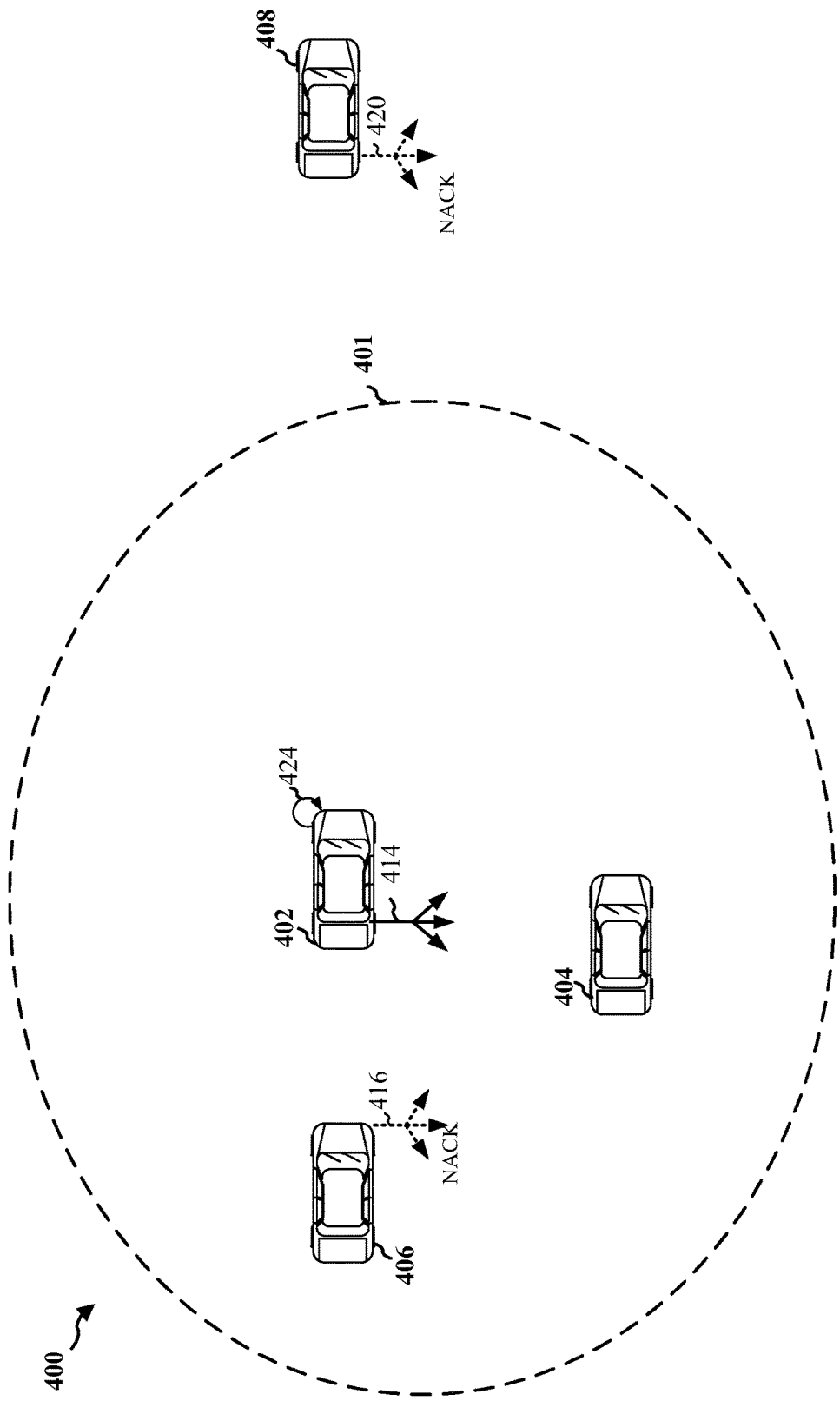
FIG. 4 illustrates an example of communication between UEs.

FIG. 4 illustrates an example of communication 400 between multiple UEs, e.g., based on V2X/V2V/D2D communication. UE 402 may be a transmitting UE that multicasts message 414 for a service group. UEs 404, 406, and 408 may be associated with the service group. UE 404 may have correctly received the message 414 and does not transmit a NACK. UE 406 may have experienced an error in receiving the message. Thus, UE 406 may transmit a NACK 416 indicating to UE 402 that the message was not accurately received. In response to the NACK 416, the transmitting UE 402 may determine, e.g., at 424, to retransmit the message 414. However, negative feedback, e.g., NACK(s), may be received from far away receivers that are outside the desired proximity of the transmitting UE 402. As illustrated in FIG. 4, the UE may intend for UEs within range/area 401 to receive the message reliably. UE 408 that is outside the intended area 401 and that is not proximate to UE 402 may receive at least a part of the message and send a NACK 420 to UE 402. However, UE 408 may be at such a distance that UE 408 will likely never receive the message 414 correctly even with a retransmission from UE 402. Additionally, based on the service requirement, there may be no need for the UE at that distance, e.g. UE 408, to receive the message, because the message becomes irrelevant.

Thus, NACK(s) may be received from receiving UEs associated with the service group yet that are at such a distance that the transmitter would retransmit the message in futile. Such futile retransmissions would degrade overall system performance through an inefficient use of wireless resources and through unnecessary potential interference to other wireless communication. While a group ID, e.g., a common destination ID, may be used to identify a multicast service group, in an ad hoc V2X/V2V/D2D environment, it may be difficult to manage or establish a common group identifier that is known only to vehicles in the service group that are also in the proximity of the transmitting UE because of the highly mobile nature of the transmitters and/or receivers.

Aspects are presented that limit feedback from receivers, e.g., receiving UEs, outside of an intended geographical area by providing information that enables a receiver to determine whether it is an intended receiver of the message. The receiver can then determine whether to send feedback based on whether or not the receiver is an intended receiver of the message. A transmitting device, e.g., 402, may indicate geographic area information in each multicast message indicating that receivers, e.g., 404, 406 that are within the indicated geographic area, e.g., 401, are intended to receive the message reliably and should send feedback to help improve the multicast. This may help a receiver outside of the intended area, e.g., UE 408, to determine that it does not need to send feedback. Thus, the geographic area information helps to limit feedback from receivers in the service group that are not in proximity to the transmitter. While the problems have been described using an illustration of V2X/V2V/D2D communication between UEs 402, 404, 406, 408, the concepts are equally applicable to a base station, RSU, mobile UE, vehicle UE etc. that are engaged in PC5 based communication.

In order to reduce the amount of overhead to encode the geographic area information in the message, the geographic area may be indicated using predefined zones or areas. For example, a zone ID or an area ID may be encoded in the message. In one example, the zone/area intended to reliably receive the message may comprise a circular area centered on the location of the transmitting device, e.g., UE 402 or other transmitter engaged in PC5 communication, and extending to a radius indicated to the receiving devices. In another example, predefined zones may have a non-circular shape, e.g., with a region divided into a set of rectangular, hexagon, or other shaped zones, each having a corresponding zone ID. In yet another example, the predefined zones may have a customized shape. For example, the predefined zones may follow a contour of a road, a driving direction, a shape of a geographic feature, etc. In another example, hierarchical zones may be organized in different layers. Each layer corresponds to zones of a different size. For example, first layer may correspond to zones having a radius of 50 m, a width of 50 m, etc. A second layer may correspond to zones having a radius of 100 m, a width of 100 m, etc. A third layer may correspond to zones having a radius of 500 m, a width of 500 m, etc. Thus, the transmitting device and receiving device may identify the zone/area that is intended for reliable reception of the message based on a combination of a layer ID and a zone ID corresponding to the layer ID. In another example, zone divisions may be pre-configured to the receiving devices. For example, the zone divisions may be based on global coordinates of the geographic location. Then, the transmitting device may select a corresponding zone from among the pre-configured zone divisions. Receiving and transmitting devices may receive occasional updates for the pre-configured zone divisions.

Figure 5:
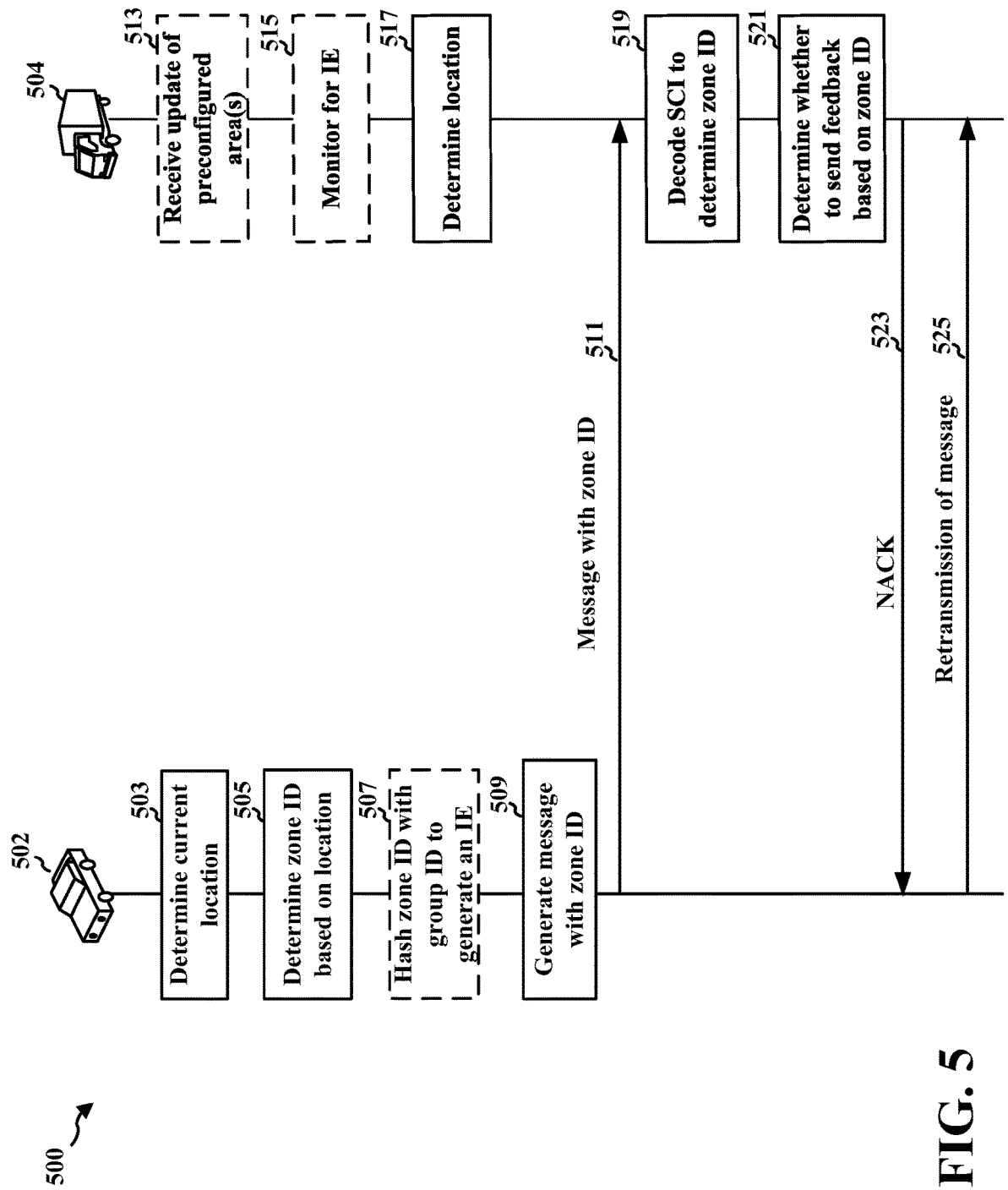
FIG. 5 illustrates an example communication flow between UEs.

FIG. 5 illustrates an example communication flow 500 between a transmitting device 502 and a receiving device 504. The communication may be based on V2X/V2V/D2D communication, e.g., PC5 multicast communication. In some aspects, the communication may be based on other D2D direct communication, such as ProSe. Although FIG. 5 illustrates an example of communication between a transmitting device 502 and a receiving device 504 that are illustrated as UEs, the concepts are equally applicable to a base station, an RSU, a mobile UE, a vehicle UE, etc. that are engaged in PC5 based communication, V2X/V2V communication or other direct D2D communication. As part of generating a service group message for transmission, e.g., via V2X/V2V/D2D, the transmitting device 502 may determine a zone/area/range for which the message is intended to be reliably received by a receiver in the service group. This may provide a way for the transmitting device 502 to limit feedback to only a receiver(s) within the intended zone/area/range. The transmitting device may determine its current geographic location, at 503, and may use the current location to determine an area/zone/range that is intended to receive the message and for which the transmitting device should receive HARQ feedback. For example, the transmitting device may identify a preconfigured zone in which the transmitting device is currently located. In another example, the zone may be centered on the transmitting device with a selected radius. In another example, the transmitting device may define the zone in another manner or otherwise select the area/range/zone.

As one example, a range may be selected, e.g., based on a Quality of Service (QoS) parameter associated with the multicast. For example, the 5QI for different services may indicate QoS information such as any of a resource type, a priority level for communication, a packet delay budget (PDB) indicating an amount of time that a packet can be delayed, a Packet Error Rate (PER) that indicates a limit on a rate of packet losses, an averaging window, a data burst volume parameter that indicates a limit on the amount of data to be served within a period of time. In addition, the application may indicate a range requirement for the traffic. For example, the range could be in the form of absolute distance, e.g. 500 meters, or in relative levels, e.g. long, medium, or short.

The transmitting device may indicate its current location and a surrounding range in the message. These may be indicated as a zone ID based on the transmitting device's geographical location and a range of the surrounding zones. For example, the transmitting device may indicate an amount or a number, N, of adjacent surrounding zones that are intended to receive the message reliably. If N=1, then the receiving device would need to be within the same zone as the transmitting device in order to be expected to reliably receive the message. If N=2, then a receiving device within the same zone as the transmitting device and within a zone directly adjacent to the zone of the transmitting device would be expected to reliably receive the message. For example, if the zones are of a rectangular shape, the devices expected to reliably receive the message should be in the same zone of the transmitting device and the 8 adjacent zones. If the zones are of a hexagon shape, the devices expected to reliably receive the message should be in the same zone of the transmitting device and the 6 adjacent zone. N may be selected to be any number.

Once the transmitting device has determined the zone/area/range intended to reliably deliver the message and within which a receiver should send feedback, the transmitting device may generate the message. The message may comprise a control portion and a data portion. The control portion may comprise in the Sidelink Control Information (SCI) an indication of the area/zone/range intended to reliably receive the message. The SCI may also include group ID information corresponding to the service group for the multicast. The group ID information may enable the message to be decoded by receivers that are associated with the service group and that know the group ID. The group ID may be the same as a destination ID or may be different than a destination ID. The group ID may be provided by an application layer, or a mid-ware layer of the UE, or mapped by the V2X layer from the ID provided by the application layer. The group ID may correspond to a higher layer ID or an ID mapped from the higher layer ID, whereas the destination ID corresponds to a lower layer ID. The group ID may be mapped to a destination ID.

Figure 12:
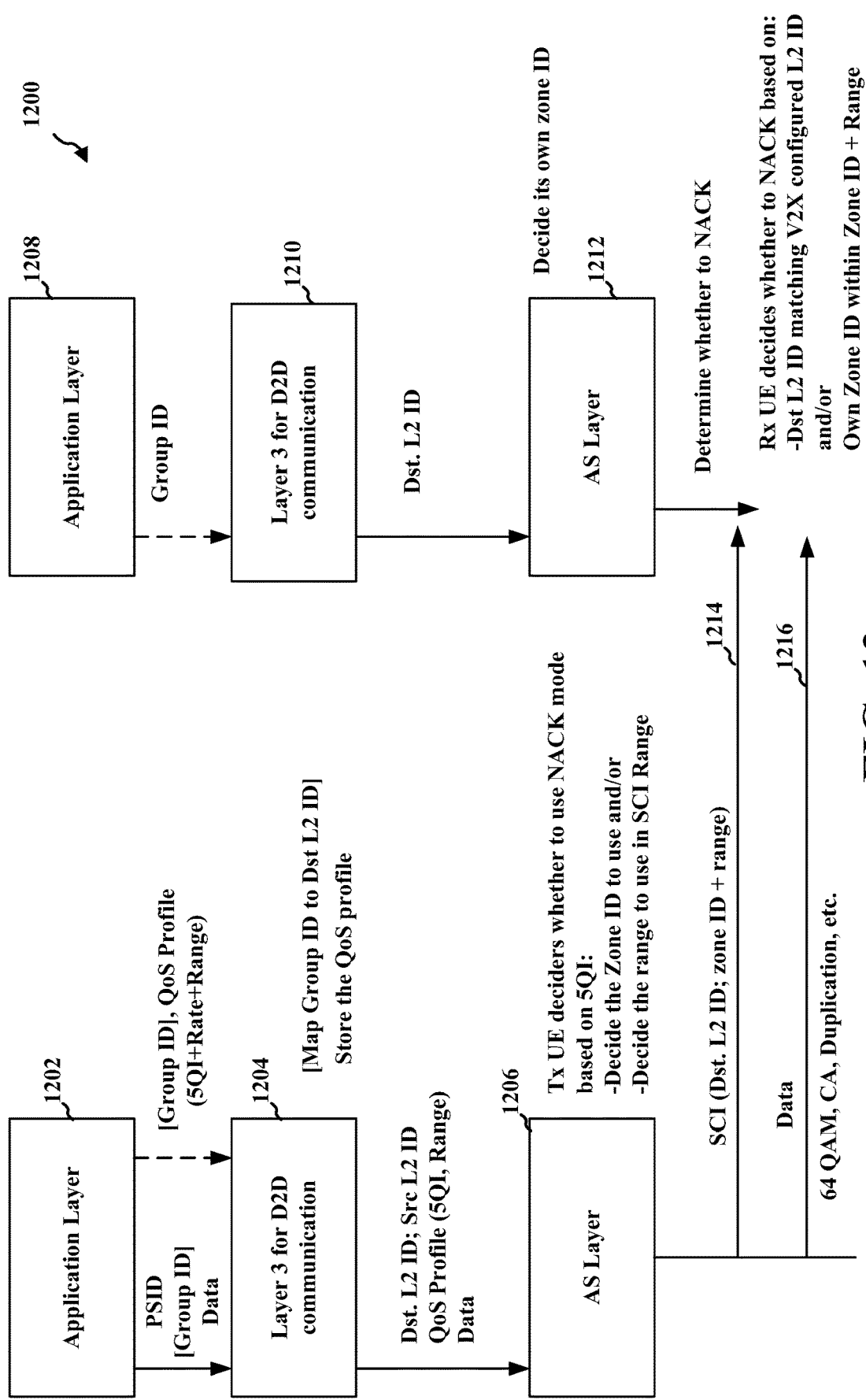
FIG. 12 illustrates an example interaction between different layers at a transmitting device and a receiving device.
Figure 13:
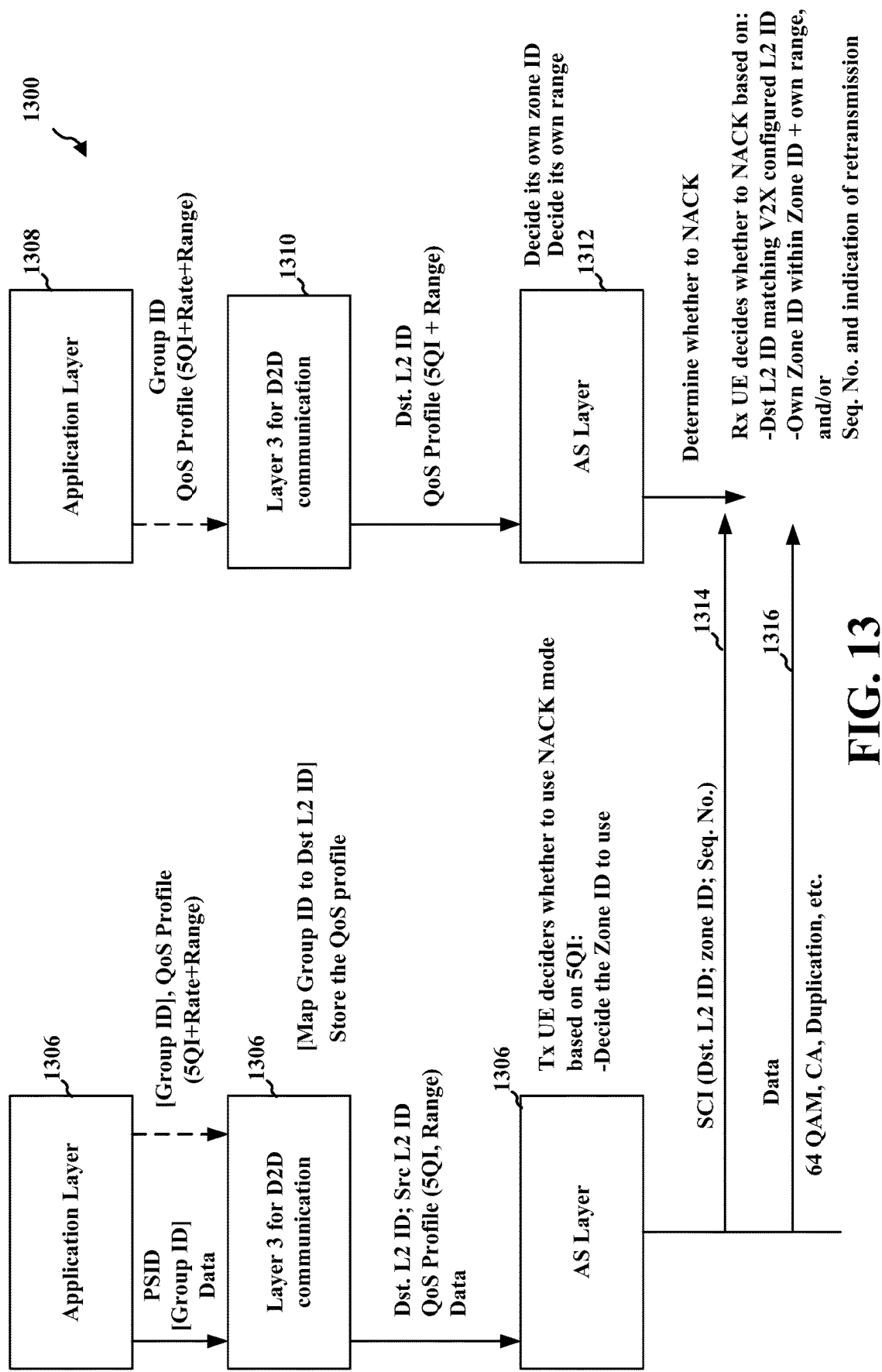
FIG. 13 illustrates an example interaction between different layers at a transmitting device and a receiving device.

FIGS. 12 and 13 illustrate examples of interaction between different layers at a transmitting device and a receiving device for the use of a zone ID for V2X/V2V communication. Although the aspects are presented for a V2X example, the aspects may be applied to other direct D2D communication. In the example 1200 in FIG. 12, Application layer 1202, Layer 3 for D2D communication, e.g., a V2X layer, 1204, and Access Stratum (AS) layer 1206 are for the transmitting device, e.g., 502. In one example Layer 3 may comprise a V2X layer. In other examples, aspects may be applied to other D2D direct communication, such as ProSe. Application layer 1208, Layer 3 for D2D communication, e.g., a V2X layer, 1210, and AS layer 1212 are for the receiving device, e.g., 504. At the transmitting device, the application layer may provide a group ID and a QoS profile for a particular service group to the Layer 3. The QoS profile may include any of an indication of 5QI for the service group, a rate for the service group, and/or a range for the service group. The application layer 1202 may also provide data to the Layer 3 to be transmitted in a message, e.g., a multicast message, to the service group. The data may be provided with a corresponding group ID. The application layer may provide a Provider Service Identifier (PSID) with the data. The Layer 3 may map the group ID received from the application layer to a Destination L2 ID (Dst. L2 ID) for the service group. The Layer 3 may also store the QoS profile for the service group. If the Layer 3 does not provide a QoS Profile to the Layer 3, the Layer 3 may use the PSID to determine a corresponding QoS Profile, e.g., mapping the PSID to a QoS profile. As well, if the application layer does not provide a Group ID to the Layer 3, the Dst. L2 ID determined by the Layer 3 may be based on a mapping of the PSID to the Dst. L2 ID. Such mapping information can be pre-configured on the UE, stored in the (U)SIM card, or provisioned from the network via a dynamic provisioning mechanism, e.g. Open Mobile Alliance (OMA) Device Management (DM) OMA-DM or UE Policy delivery mechanism. The AS layer may receive the Dst. L2 ID, a Source L2 ID, the QoS profile (e.g., including the 5QI and/or range), and data for the service group from the Layer 3. The AS layer may determine whether to use an acknowledgement mode for the multicast, e.g., a NACK mode, based on the 5QI from the QoS profile or local policy. For example, if the 5QI indicates a requirement for high reliability, e.g., very low PER value, the transmitting UE may choose to use the acknowledgement to achieve such high reliability. In the NACK mode, the transmitting device may monitor for feedback, e.g. NACK(s), in order to determine whether to retransmit the message. The AS layer 1206 may also determine a zone ID to use in the message. The zone ID may correspond to a zone in which the transmitting device is currently located. The AS layer 1206 may also determine a range to use in the message. The range may indicate an additional range either surrounding the transmitting device, or the zone or list of zones in which the receiving device is located, for which the transmitting device intends the message to be reliably received. The range may inform a receiver whether or not it should provide feedback. The transmitting device may then transmit the message, comprising SCI 1214 and data 1216. The SCI may include information indicating group ID or Dst. L2 ID, the zone ID determined by the AS, and/or the range determined by the AS.

At the receiving device, the application layer 1208 provides a group ID, for a service group of which the receiving device is associated, to the Layer 1210. The Layer 1210 determines a Dst. L2 ID based on the group ID, similar to the mapping performed by the transmitting device's Layer 1204. The AS layer 1212 at the receiving device determines its own zone ID, e.g. for the zone in which the receiving device is currently located. When the receiving device receives the message, including the SCI 1214 and the data 1216, the receiving device determines whether to send feedback, e.g., a NACK, if the data part of the message is not received correctly. The receiving device may determine whether to send the NACK based on whether the Dst. L2 ID determines by Layer 1210 matches the Dst. L2 ID indicated in the SCI 1214 of the message and/or based on whether the zone ID for the receiving device that was determined by the AS 1212 matches the zone ID indicated in the SCI 1214 or falls within the range of the zone ID indicated in the SCI 1214. If the Dst. L2 IDs match and the zone ID of the receiving device falls within the indicated range of the zone ID of the transmitting device, the receiving device may provide a NACK if the data portion of the message is not received, for example. If no Dst. L2 ID is not provided from the Layer 1210 to the AS layer 1212 at the receiving device, the receiving device may determine not to send a NACK. The SCI may carry the information regarding the Zone ID, Dst. L2 ID, and range in different forms. For example, the zone ID and Dst. L2 ID of the SCI may be hashed to reduce the overhead required to send the message. In that case, the SCI may be of a different format than that used for other V2X message transmission, e.g. broadcast messages. Therefore, an additional bit in SCI may be included in order to differentiate the format of the message, e.g., whether the message is broadcast, multicast, or unicast.

The example 1300 in FIG. 13 is similar to the example in FIG. 12. The application layer 1302 and the Layer 3 for D2D communication, e.g., a V2X layer, 1304 at the transmitting device may function similarly to the example in FIG. 12. In one example Layer 3 may comprise a V2X layer. In other examples, aspects may be applied to other D2D multicast communication, such as ProSe. However, in FIG. 13, the range might not be determined or indicated by the AS layer 1306 at the transmitting device. Instead, application layer 1308 at the receiving device may provide a QoS profile for the service group to layer 1310 at the receiving device. The 5QI and range information may be provided from the layer 1310 to the AS layer 1312 of the receiving device. The AS layer at the receiving device may then determine not only its own zone ID based on the receiving device's current location, but also the range to be used in determining whether to send feedback. Thus, the SCI 1314 sent along with the data 1316 from the transmitting device might not include information indicating the range. The receiving device may determine whether to send feedback based on any combination of whether the Dst. L2 ID of the SCI matches that determined by the layer 1310, whether the zone ID determined by the AS 1312 is within either the zone ID indicated in the SCI 1314 plus the range determined by the AS layer 1312. Alternatively, the receiving device may determine a range based on its own zone ID, and verify if the zone ID indicated in SCI 1314 is within the range. For example, the receiving device might determine not to send a NACK if the Zone ID in the SCI 1314 is not in the range of its own zone ID. As explained above, the SCI may include other information to support the operation. For example, it may include an indication of whether the message is a retransmitted message, and a sequence number for the message. In this case, the receiving device may determine whether to send a NACK based on whether it has already received the original transmission of the same message.

In order to further reduce the overhead of transmitting the zone/area/range information in the message, the transmitting device may hash the group ID and the zone ID, at 507, to generate a shortened ID, e.g., an Information Element (IE). The IE may then be embedded in the SCI of the message as part of the generation of the message at 509. After generation at 509, the transmitting device 502 may transmit the message 511, along with the IE.

Receiving device 504 decodes at least a portion of the message, at 519, in order to determine the indication of the range/area/zone intended to receive the message reliably, e.g., zone ID information. The receiving device might receive the control portion of the message, but might not correctly receive the data portion of the message. As the message is not received correctly, the receiving device 504 may need to determine whether to send HARQ feedback, e.g., a NACK, to the transmitting device 502. The receiving device may determine, at 521, whether to send a NACK based on a current location of the receiving device and based on the indication, included in the message, of the range/area/zone intended to receive the message reliably. Thus, the receiving device may determine its current location, at 517 and may determine to send a NACK when the receiving device 504 is within the indicated range/area/zone. For example, the receiving device may send a NACK if the receiving device is in the same zone as the transmitting device, e.g., when N=1, or within a list of surrounding zones, when N>1. The surrounding zones may be based on a range/number/amount indicated to the receiving device 504. In another example, the range/number/amount of surrounding zones may be a function of a QoS for the multicast service. The QoS may be configured via RRC or via an upper layer.

The area/zone/range indicated in the message 511 may reference at least one preconfigured zone, the preconfigured zones being preconfigured and stored at the receiving device. As illustrated at 513, the receiving device may receive an update of the preconfigured zone(s)/area(s)/range(s). Although not illustrated, the transmitting device 502 may receive similar updates of the preconfigured zone(s)/area(s)/range(s). At times a device may operate as a transmitting device, and at other times, the same device may operate as a receiving device.

When the indication of the area and/or group ID is comprised in an IE, the receiving device 504 may monitor for at least one IE in SCI of any received messages, at 515. The IE(s) for which the receiving device monitors, at 515, may be based on a predetermined hash of any group ID for multicast services with which the receiving UE is associated hashed with surrounding zone IDs. As the receiving device may be mobile, the surrounding zone IDs may be updated based on the receiving device's current location.

If the UE determines, at 521, that the UE is within the area/zone/range of intended reliable receipt of the message, and the UE has not correctly received the message 511, the UE may respond with a NACK 523 to the transmitting device 502. The UE may determine whether to send the NACK based on additional aspects, e.g., whether the receiver is associated with the service group corresponding to a group ID comprised in the message, etc. In response to the NACK 523, the transmitting device 502 may retransmit the message 525 in order to ensure reliable receipt of the message by the receiving device 504.

Figure 6:
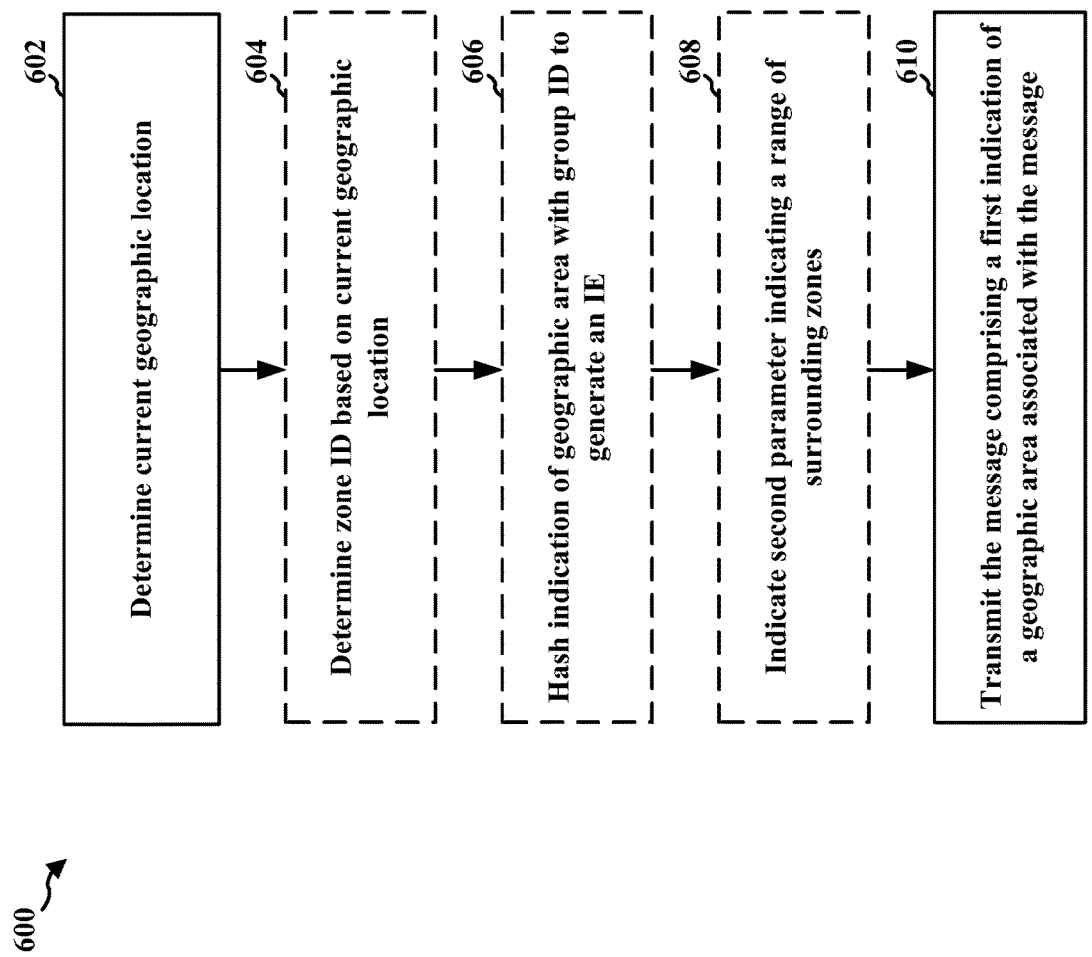
FIG. 6 is a flowchart of a method of wireless communication.

FIG. 6 is a flowchart 600 of a method of wireless communication. The method may be performed by a transmitting device or a component of a transmitting device, e.g., a UE 104, 402, 1050; a base station 102, 180; an RSU 107; transmitting device 310, 502; the apparatus 702, 702'; processing system 814. The transmitting device may transmit directly to receiving devices, e.g., to UE(s), RSU(s), base station(s), based on V2V or V2X communication, or other direct D2D communication. The transmitting device may comprise any device engaged in PC5 communication. Optional aspects are illustrated with a dashed line. The method improves system performance through improved efficiency in the use of wireless resources and by avoiding unnecessary interference that may be caused through retransmissions to unintended receivers that are not proximate to the transmitting device.

At 602, the transmitting device determines a geographic location of the transmitting device. The location may be determined, e.g., by location component 708 of apparatus 702. The transmitting device may determine the geographic location based on any of Global Positioning System (GPS), etc. A geographic area for message(s) transmitted by the transmitting device may be based, at least in part, on the geographic location of the transmitting device.

At 610, the transmitting device transmits the message to the service group, e.g., via V2X/V2V/D2D communication. The transmission may be performed, e.g., by transmission component 706 and/or message component 710 of apparatus 702. FIG. 5 illustrates an example transmission of a message 511. The message may be transmitted for a service group, and may include a first indication of a geographic area associated with the message. A service group may include one or more UEs. The message may include a multicast message for a service group, such as described in connection with FIG. 4. The transmitting device may rely on feedback in order to ensure reliable receipt of the message by a receiver that is both associated with the service group and in proximity to the transmitting device. The indication of the geographic area associated with the message may inform a receiving device about the intended range of reliable receipt for the message. Thus, the first indication of the geographic area may indicate a range in which feedback is requested from a receiving device. The message may further comprise group ID information for the service group.

The geographic area indicated by the first indication may comprise a reference to a preconfigured area, e.g., that is known by the transmitting device and a receiving device. For example, global zones may be divided into preconfigured zones, and the transmitting device may indicate at least one of the preconfigured zones, e.g., through the use of a zone ID. In another example, the first indication of the geographic area may indicate an area determined by the transmitting device. The first indication of the geographic area may indicate a radius surrounding the geographic location of the transmitting device. In another example, the first indication of the geographic area may indicate a non-circular area. The first indication of the geographic area may be determined based on a QoS parameter associated with the message. Likewise, a range surrounding the geographic, e.g., N, area may similarly be determined based on a QoS parameter associated with the message.

The first indication of the geographic area may be in a form of a zone ID comprising reduced information for the geographic area, e.g., using a last M number of bits of a global zone ID. The first indication of the geographic area may be in a form of a zone ID based on a modulo operation performed on the geographic area information, e.g., to only include remainders of the zone ID. The first indication of the geographic area may be based on a hierarchical layer of areas. Thus, the first indication may comprise a layer ID and an area ID corresponding to the layer ID.

The first indication of the geographic area may indicate a zone ID. Reference to a zone ID may reduce an amount of overhead required in the message to indicate the area to receiving device(s). Thus, the transmitting device may determine a zone ID based on the geographic location of the transmitting device, at 604. The zone ID may be determined, e.g., by zone ID component 712 of apparatus 702. The zone ID may correspond to a zone in which the transmitter device is currently located. The transmitting device may further indicate, at 608, a second indication of a parameter indicating a range of at least one zone surrounding a zone of the Zone ID from which feedback is requested. The indication of the range may indicate a number/amount, e.g., N, of adjacent zones surrounding the zone in which the transmitter device is located and for which reliable receipt of the message is intended. N may be equal to one or more. If N=1, then the parameter may indicate that feedback is only requested from receivers located in the same zone as the transmitting device. If N>1, the parameter may indicate that feedback is requested for adjacent layers of zones surrounding the zone in which the transmitting device is located. For example, if N=2, feedback may be requested from the zone of the transmitting device and a surrounding layer of zones that are directly adjacent to the transmitting device's zone. If N=3, feedback may be requested from an additional group of surrounding zones.

The first indication of the geographic area and/or the group ID information may be comprised in a control portion of the message, e.g., in SCI. In order to further reduce the overhead needed to indicate the group ID and/or the intended range/area/zone, the transmitting device may hash the first indication of the geographic area and/or the group ID, at 606, to generate at least one IE. The hash may be performed, e.g., by hash component 714 of apparatus 702. In one example, the group ID and a zone ID may be hashed to form a single IE. In another example, the group ID may be hashed to form a first IE and the zone ID may be hashed to form a second IE. In another example, one of the group ID or the zone ID may be hashed to form an IE and the other of the zone ID or the group ID may be indicated in the control information in another manner. The IE(s) may be comprised in the message, e.g., embedded in SCI.

As described in connection with FIG. 5, if the transmitting device receives negative feedback from at least one receiver that is in the service group, and in proximity based on the indicated area information, the transmitting device may retransmit the message, e.g., 525. Feedback may be received, e.g., by feedback component 720 of apparatus 702. Retransmission(s) may be performed, e.g., by message component 710 and/or transmission component 706 of apparatus 702.

Figure 7:
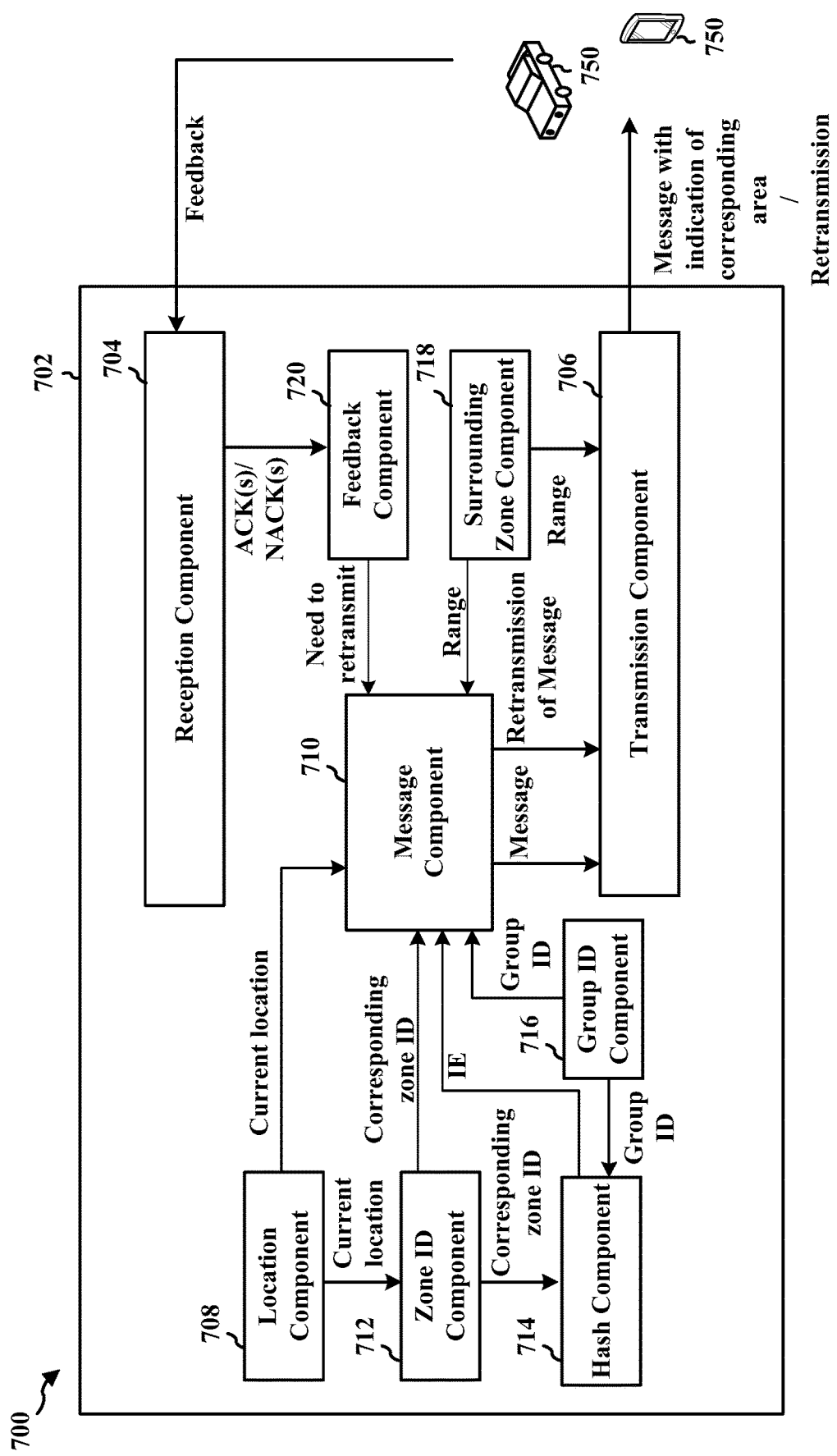
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a transmitting device, e.g., a UE or a component of a UE (e.g., UE 104, 402; device 310, 502). In other examples, the transmitting device may comprise a base station 102, 180, or an RSU 107 engaged in PC5 communication. The mobile transmitting device may transmit directly to mobile receiving devices, e.g., to other UEs based on V2V/V2X/D2D communication. The apparatus includes a reception component 704 that receives communication from other UEs 750, RSUs, and/or base stations, e.g., based on PC5 communication. The apparatus includes a transmission component 706 that transmits communication to the other UEs 750 UEs 750, RSUs, and/or base stations, e.g., based on PC5 communication. The communication may be transmitted and received as sidelink communication. Although the apparatus 702 and 1002 are illustrated separately, a single device may operate at times as a transmitter and at other times as a receiver. Thus, a single device may comprise each of the components described in connection with FIGS. 7 and 10.

The apparatus may include a location component 708 configured to determine a geographic location of the transmitting device (e.g., as described in connection with 503 in FIGS. 5 and 602 in FIG. 6). The apparatus may include a message component 710 configured to generate a message for a service group, the message comprising a first indication of a geographic area associated with the message (e.g., as described in connection with 509 in FIGS. 5 and 610 in FIG. 6). The indication of the geographic area may be based at least in part on the geographic location of the transmitting device. Thus the location component 708 may provide the determined location to the message component 710. The message may further comprise group ID information, e.g., as identified by group ID component 716 that may provide group ID information to the message component for inclusion in the message. The transmission component 706 may be configured to transmit the message to a service group, e.g., via V2V/V2X/D2D communication (e.g. as described in connection with 511 in FIGS. 5 and 612 in FIG. 6). The transmission component 706 may receive the message for transmission, as generated by the message component 710. The indication of the geographic area may be indicated using a zone ID. Thus, the apparatus may include a zone ID component 712 configured to determine the zone ID based on the geographic location of the transmitting device (e.g., as described in connection with 505 in FIGS. 5 and 604 in FIG. 6) and to provide the zone ID to the message component 710 for inclusion in the message. In other examples, the first indication included in the message may be based on the current location of the apparatus without use of a zone ID. The apparatus may include a surrounding zone component 718 configured to transmit, e.g., via transmission component 706, a second indication of a parameter indicating a range of at least one zone surrounding a zone of the Zone ID from which feedback is requested (e.g., as described in connection with 608 in FIG. 6). The range indication may be sent separately from the message, or may be provided to the message component for inclusion in the message. The apparatus may include a hash component 714 configured to hash the first indication of the geographic area (e.g., from zone ID component 712) with the group ID (determined by group ID component 716) to generate an information element IE having a reduced size that can be included in the message, e.g., by providing the generated IE to the message component 710. In another example, the hash component 714 may be configured to hash the group ID to form a first IE and/or to hash the zone ID to form a second IE. In other examples, the group ID may be provided to the message component 710 separately from the hashed IE and may be indicated in the message in another manner. The apparatus may further include a feedback component 720 that is configured to receive feedback from at least one receiving device (e.g., as described in connection with 523 in FIG. 5). The feedback may comprise positive or negative feedback. In response to negative feedback, and/or the absence of positive feedback, the feedback component 720 may provide an indication to the message component 710 to retransmit the message. The message component 710 may be configured to retransmit the message based on the feedback.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
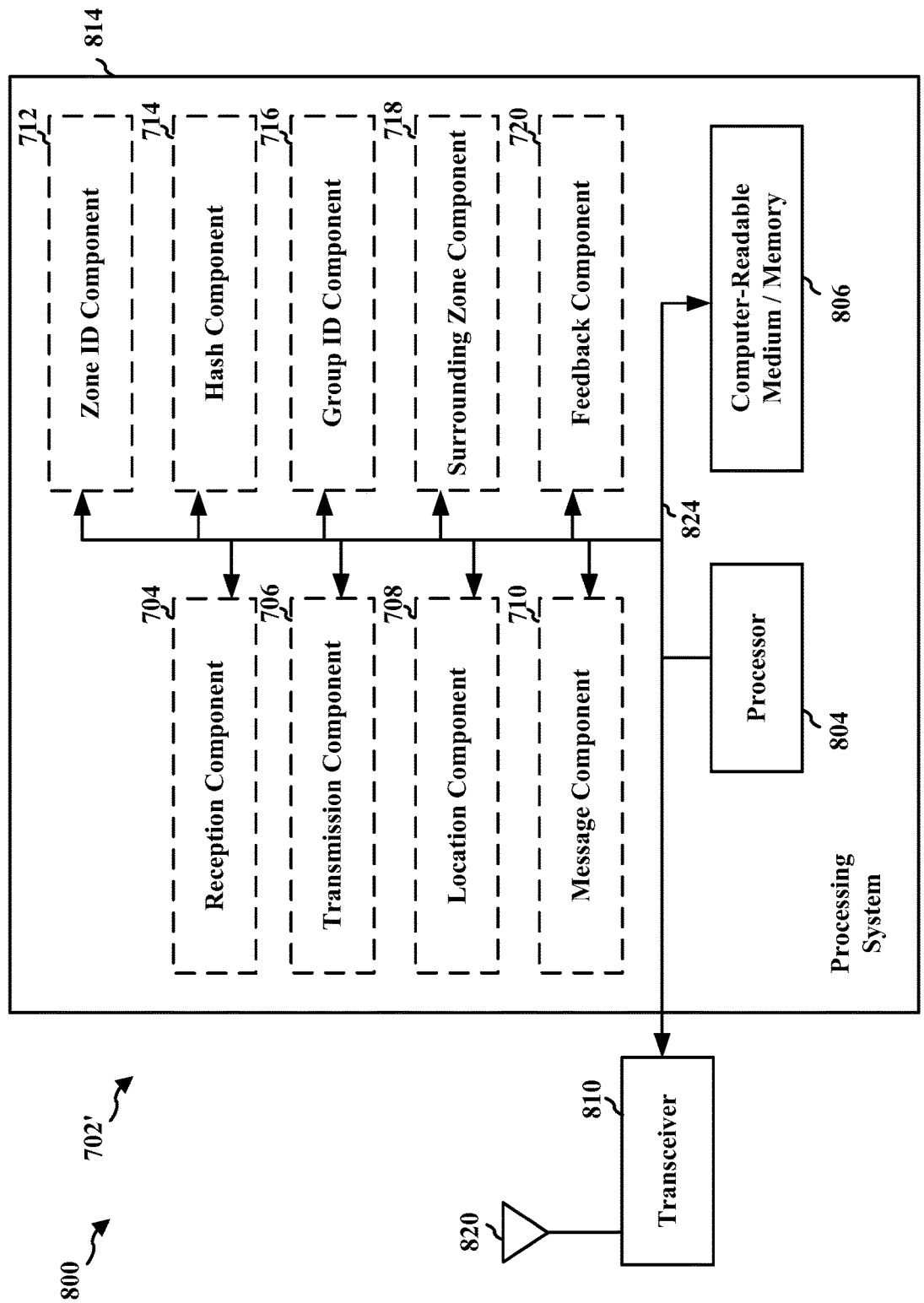
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720. The components may be software components running in the processor 804, resident/stored in the computer readable medium/memory 806, one or more hardware components coupled to the processor 804, or some combination thereof. The processing system 814 may be a component of the device 350 and may include the memory 360 and/or at least one of the TX processor 368, the RX processor 356, and the controller/processor 359. Alternatively, the processing system may comprise the entire device, e.g., an entire UE.

In one configuration, the apparatus 702/702' for wireless communication includes means for determining a geographic location of the transmitting device (e.g., at least location component 708); means for generating a message for a service group, the message comprising a first indication of a geographic area associated with the message, the geographic area based at least in part on the geographic location of the transmitting device (e.g., at least message component 710); means for transmitting the message to the service group via V2X communication (e.g. at least transmission component 706); means for determining the zone ID based on the geographic location of the transmitting device (e.g., at least zone ID component 712); means for transmitting a second indication of a parameter indicating a range of at least one zone surrounding a zone of the Zone ID from which feedback is requested (e.g., at least surrounding zone component 718); and/or means for hashing the first indication of the geographic area with the group ID to generate an information element IE (e.g., at least hash component 714). The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
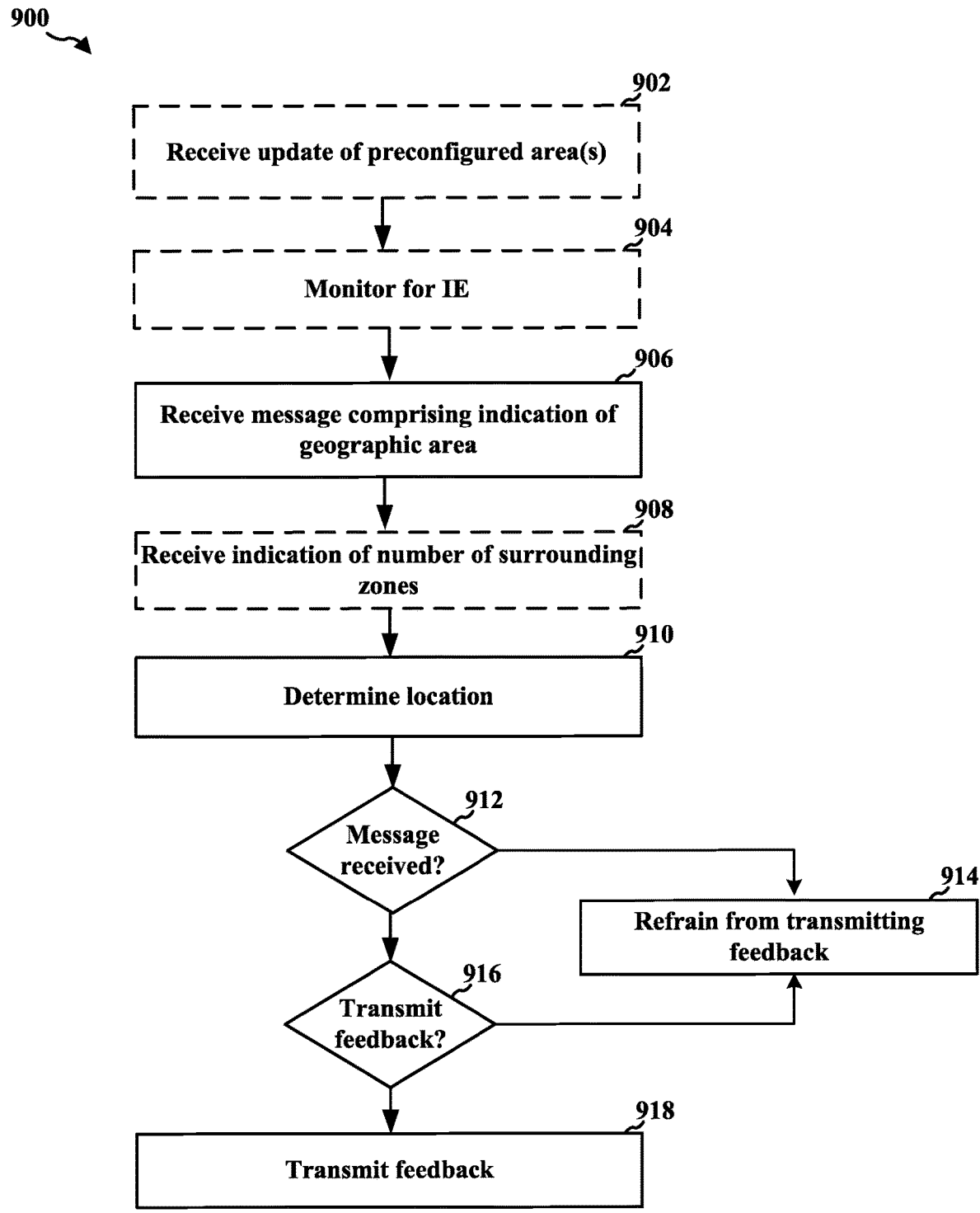
FIG. 9 is a flowchart of a method of wireless communication.

FIG. 9 is a flowchart 900 of a method of wireless communication. The method may be performed by a receiving device, e.g., a UE or a component of a UE (e.g., UE 104, 404, 406, 408, 750), a base station 102, 180, an RSU 107, receiving device 504, device 310, 350; apparatus 1002, 1002'; processing system 1114, etc. The receiving device may receive communication directly from transmitting devices, e.g., from other UEs, RSUs, base stations, etc. based on V2V, V2X, or D2D communication. The method may be performed by any receiving device engaged in a PC5 communication. Optional aspects are illustrated with a dashed line. The method improves system performance through improved efficiency in the use of wireless resources and by avoiding unnecessary interference that may be caused through retransmissions to unintended receivers that are not proximate to the transmitting device.

At 906, the receiving device receives a message for a service group, e.g., via V2X/V2V communication or other D2D communication, the message comprising a first indication of a geographic area associated with the message. The indication of the geographic area may be based at least in part on a location of the transmitting device. The reception may be performed, e.g., by reception component 1004 and/or message component 1008 of apparatus 1002.

At 910, the receiving device determines a geographic location of the receiving device. The current location may be based on any of GPS, etc. The geographic location of the receiving device may be determined, e.g., by location component 1018 of apparatus 1002. Although illustrated as occurring after receipt of the message at 906, the location of the receiving device may also be determined prior to receipt of the message. The first indication of the geographic area may comprise a zone ID. The receiving device determines to send the feedback, at 916, if the geographic location of the receiving device, as determined at 910, is within the geographic area indicated by the zone ID. The determination may be performed, e.g., by determination component 1010 based on information from zone ID component 1020 of apparatus 1002. The receiving device may also determine to send the feedback, at 916, if the geographic location of the receiving device is within a range of at least one zone surrounding a zone of the zone ID. The surrounding zone may be determined, e.g., by surrounding zone component 1022 of apparatus 1002. For example, the receiving device may receive, at 908, a second indication of a parameter indicating the range of at least one zone, e.g., N, as described in connection with FIGS. 5 and 6. The parameter may indicate a number of adjacent zones, wherein the receiving devices determines to send the feedback if the geographic location of the receiving device is within the range based on the number of adjacent zones surrounding the zone of the zone ID. The range may be derived from SCI for the message.

The first indication of the geographic area may be in a form of a zone ID comprising reduced information for the geographic area, e.g., using a last M number of bits of a globally zone ID. The first indication of the geographic area may be in a form of a zone ID based on a modulo operation performed on the geographic area information, e.g., to only include remainders of the zone ID. The first indication of the geographic area may be based on a hierarchical layer of areas. Thus, the first indication may comprise a layer ID and an area ID corresponding to the layer ID.

At 916, the receiving device determines whether to send a feedback for the message based on the first indication of the geographic area associated with the message and the geographic location of the receiving device. The determination may be performed, e.g., by determination component 1010. For example, the receiving device may determine to send the feedback, at 916, if the geographic location of the receiving device is within an intended range based on the first indication of the geographic area associated with the message. The receiving device may then proceed to transmit a feedback, at 918. The feedback may be transmitted by feedback component 1012 and/or transmission component 1006 of apparatus 1002. The feedback may include a NACK, as an example. The determination regarding whether to send the feedback may be further based on a determination of whether the message is received correctly, at 912. Correct reception may be determined, e.g., by receipt component 1016 of apparatus 1002. The receiving device may determine to refrain from sending the feedback, at 916, if the geographic location of the receiving device is outside of an intended range based on the first indication of the geographic area associated with the message. Then, the UE may refrain from transmitting the feedback at 914, or might otherwise not be required to transmit the feedback. While this example is described in connection with providing negative feedback, the UE may also determine to send positive feedback when a message is properly received. The message may further comprise group ID information for the service group, and the receiving device may determine whether to send the feedback for the message, at 916, further based on the group ID information comprised in the message. For example, the receiving device might only send feedback if the group ID is for a service group to which the receiving device corresponds.

The geographic area indicated by the first indication may comprise a reference to a preconfigured area, e.g., that is known by the transmitting device and a receiving device. For example, global zones may be divided into preconfigured zones, and the transmitting device may indicate at least one of the preconfigured zones, e.g., through the use of a zone ID. At 902, the receiving device may receive an update of the preconfigured area. The update may be received, e.g., by update component 1024 of apparatus 1002. In another example, the first indication of the geographic area may indicate an area determined by the transmitting device. The first indication of the geographic area may indicate a radius surrounding the geographic location of the transmitting device. In another example, the first indication of the geographic area may indicate a non-circular area. The first indication of the geographic area may be determined based on a QoS parameter associated with the message. Likewise, a range surrounding the geographic, e.g., N, area may similarly be determined based on a QoS parameter associated with the message.

The message may comprise at least one IE based on a hash of a zone ID and/or a group ID, e.g., comprised in SCI of the message. In one example, the group ID and a zone ID may be hashed to form a single IE. In another example, the group ID may be hashed to form a first IE and the zone ID may be hashed to form a second IE. In another example, one of the group ID or the zone ID may be hashed to form an IE and the other of the zone ID or the group ID may be indicated in the control information in another manner. Thus, the receiving device may monitor, at 904, for at least one IE based on at least one pre-determined hash that is based on the group ID for the service group and/or zone IDs surrounding the geographic location of the receiving device. For example, monitor component 1014 of apparatus 1002 may monitor for the IE(s). As described in connection with 515 in FIG. 5, the receiving device may use group ID(s) for at least one service group to which the receiving device is associated along with zone IDs for a surrounding range of zones to form a set of at least one IE. Then, the UE may monitor for the IE(s) to be included in any received message. Based on the monitoring, the UE may quickly identify messages for which the UE should transmit feedback.

Figure 10:
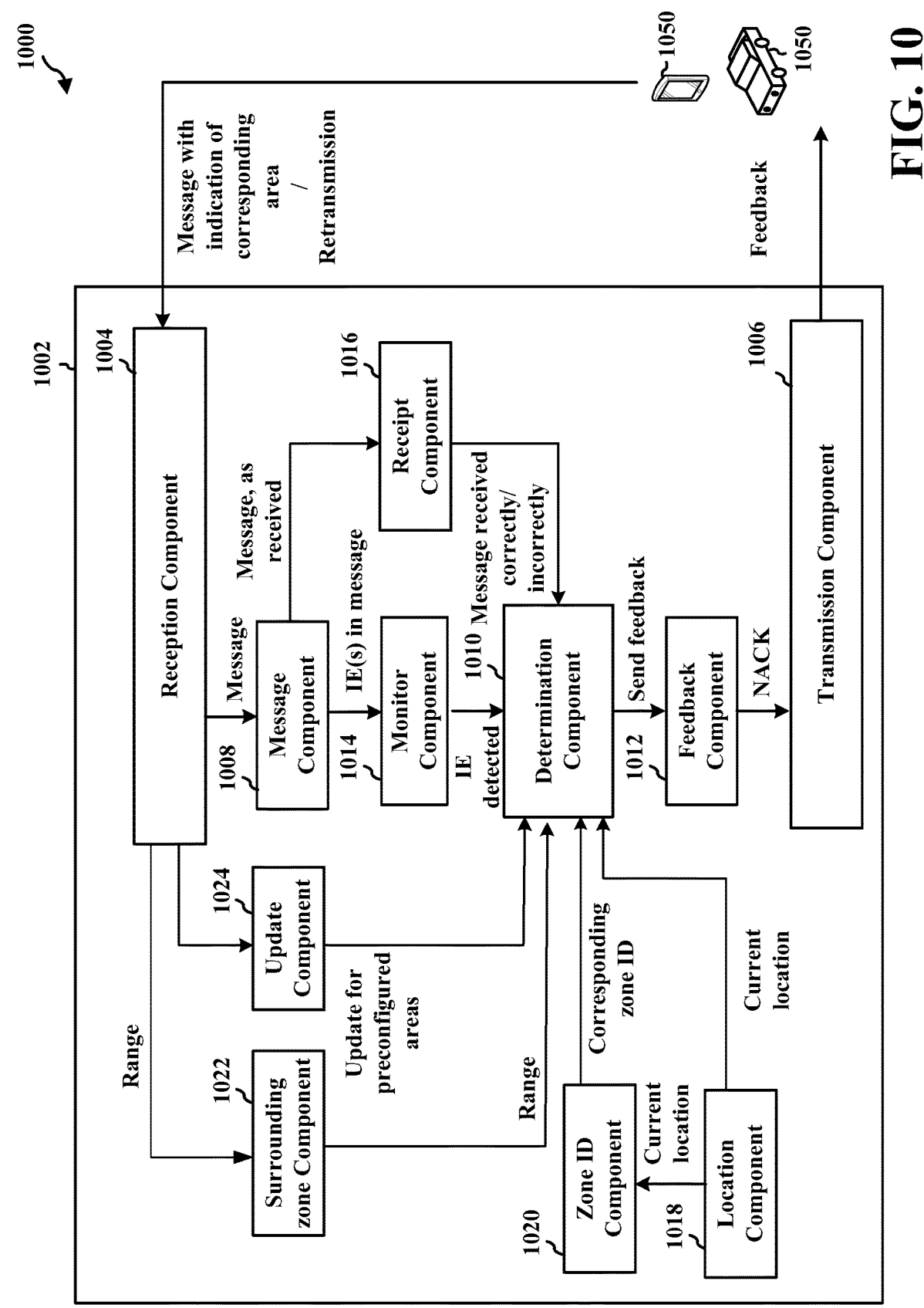
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a mobile receiving device, e.g., a UE or a component of a UE (e.g., UE 104, 404, 406, 408, 504, device 310). In other examples, the receiving device may comprise a UE, a base station, or an RSU engaged in PC5 communication. The receiving device may receive communication directly from transmitting devices, based on V2V/V2X/D2D communication. The apparatus 1002 includes a reception component 1004 that receives communication from other UEs 1050, RSUs, and/or base stations, e.g., based on PC5 communication. The apparatus includes a transmission component 1006 that transmits communication to the other UEs 1050 UEs 1050, RSUs, and/or base stations, etc., e.g., based on PC5 communication. The communication may be transmitted and received as sidelink communication. Although the apparatus 702 and 1002 are illustrated separately, a single device may operate at times as a transmitter and at other times as a receiver. Thus, a single device may comprise each of the components described in connection with FIGS. 7 and 10.

The apparatus may include a message component 1008 configured to receive a message for a service group, e.g., via V2V/V2X communication or other D2D communication, the message comprising a first indication of a geographic area associated with the message (e.g., as described in connection with 511 in FIGS. 5 and 906 in FIG. 9). The apparatus may include a location component 1018 configured to determine a geographic location of the receiving device (e.g., as described in connection with 517 in FIGS. 5 and 910 in FIG. 10). The apparatus may include a determination component 1010 configured to determine whether to send a feedback for the message based on the first indication of the geographic area associated with the message and the geographic location of the receiving device (e.g., as described in connection with 916 in FIGS. 9 and 521 in FIG. 5). Information from the message component 1008 may be provided to the determination component, e.g., including an IE, a group ID, a zone ID, etc. As well, the current location determined by the location component 1018 may be provided to the determination component 1010. The apparatus may further include a zone ID component 1020 configured to determine a zone ID for a zone in which the apparatus is currently located, e.g., based on the determination of the location by the location component 1018. The zone ID may similarly be provided to the determination component for use in determining whether to send feedback. The apparatus may include a feedback component 1012 configured to transmit feedback, e.g., a NACK if the message is not received correctly and based on the determination made by the determination component (e.g., as described in connection with 918 in FIGS. 9 and 523 in FIG. 5) The apparatus may include a surrounding zone component 1022 configured to receive a second indication of a parameter indicating the range of at least one zone (e.g., as described in connection with 908 in FIG. 9). The range of surrounding zones, whether one or more, may be provided to the determination component 1010 for use in determining whether to send feedback. The apparatus may include an update component 1024 configured to receive an update of the preconfigured area (e.g., as described in connection with 513 in FIGS. 5 and 902 in FIG. 9). Any updates may be provided to the determination component. The apparatus may include a monitor component 1014 configured to monitor for at least one of the first IE, the second IE, or the third IE based on at least one pre-determined hash based on at least one of the group ID for the service group or zone IDs surrounding the geographic location of the receiving device (e.g., as described in connection with 515 in FIGS. 5 and 904 in FIG. 9. The monitor component 1014 may determine at least one IE for which the apparatus should send feedback and may monitor for the IE(s) in any received messages. If an IE is detected, the monitor component 1014 may provide an indication to the determination component 1010. The apparatus may further include a receipt component 1016 configured to determine whether the message is received correctly. The determination as to whether the message is received correctly may be provided to the determination component for use in determining whether to provide feedback.

The apparatus may include additional components that perform each of the blocks of the algorithm in the aforementioned flowcharts of FIGS. 5 and 9. As such, each block in the aforementioned flowcharts of FIGS. 5 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
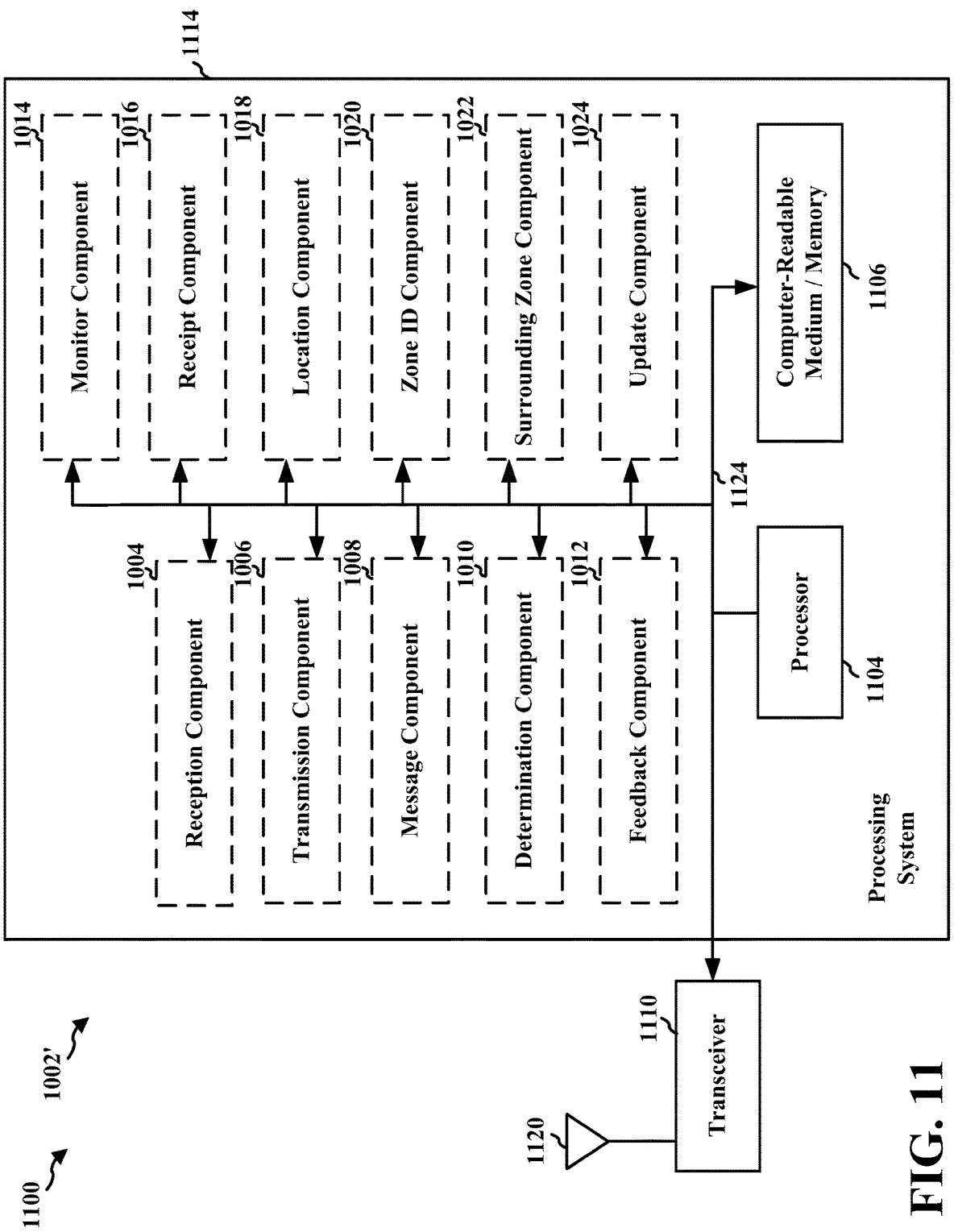
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020, 1022, 1024, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020, 1022, 1024. The components may be software components running in the processor 1104, resident/stored in the computer readable medium/memory 1106, one or more hardware components coupled to the processor 1104, or some combination thereof. The processing system 1114 may be a component of the device 350 and may include the memory 360 and/or at least one of the TX processor 368, the RX processor 356, and the controller/processor 359. Alternatively, the processing system may comprise the entire device, e.g., an entire UE.

In one configuration, the apparatus 1002/1002' for wireless communication includes means for receiving a message for a service group via V2X communication, the message comprising a first indication of a geographic area associated with the message (e.g., at least message component 1008 and/or reception component 1004); means for determining a geographic location of the receiving device (e.g., at least location component 1018); means for determining whether to send a feedback for the message based on the first indication of the geographic area associated with the message and the geographic location of the receiving device (e.g., at least determination component 1010); means for transmitting feedback, e.g., a NACK if the message is not received correctly (e.g., at least feedback component 1012); means for receiving a second indication of a parameter indicating the range of at least one zone (e.g., at least surrounding zone component 1022); means for receiving an update of the preconfigured area (e.g., at least update component 1024); and means for monitoring for the IE based on at least one pre-determined hash based on the group ID for the service group and zone IDs surrounding the geographic location of the receiving device (e.g., at least monitor component 1014). The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a wireless device, comprising:
 receiving sidelink control information (SCI), from a second wireless device, that indicates a zone identifier (ID) associated with a sidelink groupcast message from the second wireless device;
 determining a location of the wireless device; and
 determining whether to send a feedback for the sidelink groupcast message based on the zone ID associated with the sidelink groupcast message and the location of the wireless device.

2. The method of claim 1, wherein the feedback comprises hybrid automatic repeat request (HARQ) feedback.

3. The method of claim 1, wherein the zone ID is based in part on a geographic location of the second wireless device that is a source of the sidelink groupcast message.

4. The method of claim 1, further comprising:
 sending the feedback if the location of the first wireless device is within a range based on the zone ID associated with the sidelink groupcast message.

5. The method of claim 4, further comprising:
 receiving an indication of the range in the SCI for the sidelink groupcast message.

6. The method of claim 1, further comprising:
 determining that the location of the wireless device is within a range for the sidelink groupcast message based on the zone ID; and
 transmitting the feedback for the sidelink groupcast message when the wireless device is unsuccessful in correctly receiving the sidelink groupcast message and the location of the wireless device is within the range.

7. The method of claim 1, further comprising:
 determining whether the sidelink groupcast message is received correctly;
 determining that the location of the wireless device is within a range for the sidelink groupcast message based on the zone ID; and
 transmitting the feedback for the sidelink groupcast message when the wireless device is unsuccessful in correctly receiving the sidelink groupcast message and the location of the wireless device is within the range.

8. The method of claim 1, further comprising:
 refraining from sending the feedback if the location of the first wireless device is outside of a range based on the zone ID associated with the sidelink groupcast message.

9. The method of claim 1, wherein the SCI further comprises a group identifier (ID) representing a service group, and wherein the determining whether to send the feedback for the sidelink groupcast message is further based on the group ID comprised in the SCI.

10. The method of claim 1, wherein the determining whether to send the feedback for the sidelink groupcast message includes determining to send the feedback if the location of the wireless device is within a geographic area indicated by the zone ID.

11. The method of claim 1, wherein the determining whether to send the feedback for the sidelink groupcast message includes determining to send the feedback based on the location of the wireless device and a combination of the zone ID and a range for the sidelink groupcast message.

12. The method of claim 1, wherein the zone ID is based on a modulo operation performed on geographic area information.

13. The method of claim 1, wherein a geographic area indicated by the zone ID comprises a preconfigured area.

14. The method of claim 13, further comprising:
 receiving an update of the preconfigured area.

15. The method of claim 1, wherein the zone ID corresponds to a non-circular area.

16. A method of wireless communication at a first device, comprising:
 determining a geographic location of the first device;
 transmitting sidelink control information (SCI) associated with a sidelink groupcast message, the SCI comprising a zone identifier (ID) based at least in part on the geographic location of the first device; and
 transmitting the sidelink groupcast message.

17. The method of claim 16, wherein the SCI further includes an indication of a range for feedback.

18. The method of claim 17, wherein the feedback comprises hybrid automatic repeat request (HARQ) feedback.

19. The method of claim 17, wherein the range is determined based on a Quality of Service (QoS) parameter associated with the sidelink groupcast message.

20. The method of claim 16, wherein the SCI further comprises a group identifier (ID) representing a service group.

21. The method of claim 16, wherein the zone ID is based on a modulo operation performed on geographic area information.

22. The method of claim 16, wherein a geographic area indicated by the zone ID comprises a preconfigured area.

23. The method of claim 16, further comprising:
 receiving feedback for the sidelink groupcast message, the feedback being based on the zone ID indicated in the SCI.

24. The method of claim 23, wherein the feedback is further based on a range that is indicated in the SCI.

25. An apparatus for wireless communication at a wireless device, comprising:
 memory; and
 at least one processor coupled to the memory and being configured to:
  receive sidelink control information (SCI), from a second wireless device, that indicates a zone identifier (ID) associated with a sidelink groupcast message, from the second wireless device;
  determine a location of the wireless device; and
  determine whether to send a feedback for the sidelink groupcast message based on the zone ID associated with the sidelink groupcast message and the location of the wireless device.

26. The apparatus of claim 25, wherein the at least one processor is further configured to:
 send the feedback if the location of the wireless device is within a range based on the zone ID associated with the sidelink groupcast message.

27. The apparatus of claim 22, wherein the at least one processor is further configured to:
 receive an indication of the range in the SCI for the sidelink groupcast message.

28. The apparatus of claim 25, wherein the feedback comprises hybrid automatic repeat request (HARQ) feedback.

29. The apparatus of claim 25, wherein the zone ID is based in part on a geographic location of the second wireless device that is a source of the sidelink groupcast message.

30. The apparatus of claim 25, wherein the at least one processor is further configured to:
 determine that the location of the first wireless device is within a range for the sidelink groupcast message based on the zone ID; and transmit the feedback for the sidelink groupcast message when the first wireless device is unsuccessful in correctly receiving the sidelink groupcast message and the location of the first wireless device is within the range.

31. The apparatus of claim 25, wherein the at least one processor is further configured to:
determine whether the sidelink groupcast message is received correctly;
determine that the location of the first wireless device is within a range for the sidelink groupcast message based on the zone ID; and
transmit the feedback for the sidelink groupcast message when the first wireless device is unsuccessful in correctly receiving the sidelink groupcast message and the location of the first wireless device is within the range.

32. The apparatus of claim 25, further comprising:
a transceiver coupled to the memory and the at least one processor.

33. An apparatus for wireless communication at a first device, comprising:
memory; and
at least one processor coupled to the memory and being configured to:
determine a geographic location of the first device;
transmit sidelink control information (SCI) associated with a sidelink groupcast message, the SCI comprising a zone identifier (ID) based at least in part on the geographic location of the first device; and
transmit the sidelink groupcast message.

34. The apparatus of claim 33, wherein the SCI further includes an indication of a range for feedback.

35. The apparatus of claim 34, wherein the feedback comprises hybrid automatic repeat request (HARQ) feedback.

36. The apparatus of claim 33, wherein the at least one processor further configured to:
receive feedback for the sidelink groupcast message, the feedback being based on the zone ID indicated in the SCI.

37. The apparatus of claim 36, wherein the feedback is further based on a range that is indicated in the SCI.

38. The apparatus of claim 33, further comprising:
a transceiver coupled to the memory and the at least one processor.

39. An apparatus for wireless communication at a first wireless device, comprising:
means for receiving sidelink control information (SCI), from a second wireless device, that indicates a zone identifier (ID) for a zone associated with a sidelink groupcast message;
means for determining a location of the first wireless device; and
means for determining whether to send a feedback for the sidelink groupcast message based on the location of the first wireless device and the zone ID received in the SCI, the zone ID indicating the zone associated with the sidelink groupcast message.

40. The apparatus of claim 39, wherein the feedback comprises hybrid automatic repeat request (HARQ) feedback.

41. The apparatus of claim 39, wherein the zone ID is based in part on a geographic location of the second wireless device that is a source of the sidelink groupcast message.

42. The apparatus of claim 39, further comprising:
means for sending the feedback if the location of the first wireless device is within a range based on the zone ID associated with the sidelink groupcast message.

43. The apparatus of claim 42, further comprising:
means for receiving an indication of the range in the SCI for the sidelink groupcast message.

44. The apparatus of claim 39, further comprising:
means for determining that the location of the first wireless device is within a range for the sidelink groupcast message based on the zone ID; and
means for transmitting the feedback for the sidelink groupcast message when the first wireless device is unsuccessful in correctly receiving the sidelink groupcast message and the location of the first wireless device is within the range.

45. The apparatus of claim 39, further comprising:
means for determining whether the sidelink groupcast message is received correctly;
means for determining that the location of the first wireless device is within a range for the sidelink groupcast message based on the zone ID; and
means for transmitting the feedback for the sidelink groupcast message when the first wireless device is unsuccessful in correctly receiving the sidelink groupcast message and the location of the first wireless device is within the range.

46. A non-transitory computer-readable storage medium storing computer executable code for wireless communication at a first wireless device, the code when executed by a processor cause the processor to:
receive sidelink control information (SCI), from a second wireless device, that indicates a zone identifier (ID) for a zone associated with a sidelink groupcast message;
determine a location of the first wireless device; and
determine whether to send a feedback for the sidelink groupcast message based on the location of the first wireless device and the zone ID received in the SCI, the zone ID indicating the zone associated with the sidelink groupcast message.

47. The computer-readable storage medium of claim 46, wherein the feedback comprises hybrid automatic repeat request (HARQ) feedback.

48. The computer-readable storage medium of claim 46, wherein the zone ID is based in part on a geographic location of the second wireless device that is a source of the sidelink groupcast message.

49. The computer-readable storage medium of claim 46, further storing the computer executable code that when executed by the processor cause the processor to:
send the feedback if the location of the first wireless device is within a range based on the zone ID associated with the sidelink groupcast message.

50. The computer-readable storage medium of claim 49, further storing the computer executable code that when executed by the processor cause the processor to:
receive an indication of the range in the SCI for the sidelink groupcast message.

51. The computer-readable storage medium of claim 46, further storing the computer executable code that when executed by the processor cause the processor to:
determine that the location of the first wireless device is within a range for the sidelink groupcast message based on the zone ID; and
transmit the feedback for the sidelink groupcast message when the first wireless device is unsuccessful in correctly receiving the sidelink groupcast message and the location of the first wireless device is within the range.

52. The computer-readable storage medium of claim 46, further storing the computer executable code that when executed by the processor cause the processor to:

determine whether the sidelink groupcast message is received correctly;

determine that the location of the first wireless device is within a range for the sidelink groupcast message based on the zone ID; and transmit the feedback for the sidelink groupcast message when the first wireless device is unsuccessful in correctly receiving the sidelink groupcast message and the location of the first wireless device is within the range.

53. An apparatus for wireless device, comprising:

means for determining a geographic location of the wireless device;

means for transmitting sidelink control information (SCI) associated with a sidelink groupcast message, the SCI comprising a zone identifier (ID) for a zone associated with the sidelink groupcast message, the zone ID being based in part on the geographic location of the wireless device; and means for transmitting the sidelink groupcast message.

54. The apparatus of claim 53, wherein the SCI further includes an indication of a range for feedback.

55. A non-transitory computer-readable storage medium storing computer executable code for wireless communication at a wireless device, the code when executed by a processor cause the processor to:

determine a geographic location of the wireless device;

transmit sidelink control information (SCI) associated with a sidelink groupcast message, the SCI comprising a zone identifier (ID) for a zone associated with the sidelink groupcast message, the zone ID being based in part on the geographic location of the wireless device; and transmit the sidelink groupcast message.

56. The computer-readable storage medium of claim 55, wherein the SCI further includes an indication of a range for feedback.

* * * * *